(12) United States Patent
Pervan et al.

(10) Patent No.: US 11,717,901 B2
(45) Date of Patent: *Aug. 8, 2023

(54) METHODS AND ARRANGEMENTS RELATING TO EDGE MACHINING OF BUILDING PANELS

(71) Applicant: Valinge Innovation AB, Viken (SE)

(72) Inventors: Darko Pervan, Viken (SE); Peter Wingardh, Viken (SE)

(73) Assignee: VALINGE INNOVATION AB, Viken (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/384,265

(22) Filed: Apr. 15, 2019

(65) Prior Publication Data

US 2019/0262915 A1 Aug. 29, 2019

Related U.S. Application Data

(63) Continuation of application No. 12/832,752, filed on Jul. 8, 2010, now Pat. No. 10,279,404.

(Continued)

(30) Foreign Application Priority Data

Jul. 31, 2009 (SE) .................... 0901053-9

(51) Int. Cl.
*B27M 3/04* (2006.01)
*B27F 1/06* (2006.01)
(Continued)

(52) U.S. Cl.
CPC ............... *B23D 43/04* (2013.01); *B27F 1/06* (2013.01); *B27M 3/04* (2013.01);
(Continued)

(58) Field of Classification Search
CPC ............... B27M 3/04; E04F 15/02005; E04F 15/02033; B27F 1/02; B27F 1/04; B27F 1/06

See application file for complete search history.

(56) References Cited

U.S. PATENT DOCUMENTS 2,110,728 A 3/1938 Hoggatt
2,430,200 A 11/1947 Wilson
(Continued)

FOREIGN PATENT DOCUMENTS

CN 101 391 427 A1 3/2009
DE 138 992 C 7/1901
(Continued)

OTHER PUBLICATIONS

U.S. Appl. No. 15/072,804, Darko Pervan, Marcus Bergelin and Chrian Boo, filed Mar. 17, 2016 (cited herein as US Patent Application Publication No. 2016/0221212 A1 of Aug. 4, 2016).

(Continued)

*Primary Examiner* — Christopher J Besler
(74) *Attorney, Agent, or Firm* — Boone IP Law

(57) ABSTRACT

A tool configuration 91 for producing an improved locking system of a floor panel 1' and a method incorporating such tool configuration. The tool configuration 91x, 91y, is a non-rotating tool configuration profiling certain surfaces of the joint edge of the floor panel, resulting in that the tolerances can be kept on a low level.

23 Claims, 16 Drawing Sheets

Related U.S. Application Data

(60) Provisional application No. 61/234,480, filed on Aug. 17, 2009.

(51) Int. Cl.
*E04F 15/02* (2006.01)
*B23D 43/04* (2006.01)

(52) U.S. Cl.
CPC .............. *E04F 15/02038* (2013.01); *E04F 2201/0153* (2013.01); *Y10T 29/49623* (2015.01); *Y10T 29/52* (2015.01)

(56) References Cited

U.S. PATENT DOCUMENTS

| | | |
|---|---|---|
| 3,187,612 A | 6/1965 | Hervey |
| 3,656,220 A | 4/1972 | Dupuis |
| 3,731,445 A | 5/1973 | Hoffmann et al. |
| 4,083,390 A | 4/1978 | Ingham |
| 4,169,688 A | 10/1979 | Toshio |
| 4,426,820 A | 1/1984 | Terbrack et al. |
| 4,495,733 A | 1/1985 | Börner et al. |
| 4,498,361 A | 2/1985 | Grace |
| 4,512,131 A | 4/1985 | Laramore |
| 4,564,320 A | 1/1986 | Roseliep |
| 4,599,841 A | 7/1986 | Haid |
| 4,819,932 A | 4/1989 | Trotter, Jr. |
| 5,135,597 A | 8/1992 | Barker |
| 5,295,341 A | 3/1994 | Kajiwara |
| 5,352,068 A | 10/1994 | Roseliep |
| 5,577,357 A | 11/1996 | Civelli |
| 5,860,267 A | 1/1999 | Pervan |
| 5,950,389 A | 9/1999 | Porter |
| 6,006,486 A | 12/1999 | Moriau et al. |
| 6,182,410 B1 | 2/2001 | Pervan |
| 6,203,653 B1 | 3/2001 | Seidner |
| 6,254,301 B1 | 7/2001 | Hatch |
| 6,295,779 B1 | 10/2001 | Canfield |
| 6,332,733 B1 | 12/2001 | Hamberger |
| 6,339,908 B1 | 1/2002 | Chuang |
| 6,358,352 B1 | 3/2002 | Schmidt |
| 6,418,683 B1 | 7/2002 | Martensson et al. |
| 6,450,235 B1 | 9/2002 | Lee |
| 6,490,836 B1 | 12/2002 | Moriau et al. |
| 6,497,079 B1 | 12/2002 | Pletzer et al. |
| 6,576,079 B1 | 6/2003 | Kai |
| 6,584,747 B2 | 7/2003 | Kettler et al. |
| 6,591,568 B1 | 7/2003 | Pålsson |
| 6,681,820 B2 | 1/2004 | Olofsson |
| 6,729,091 B1 | 5/2004 | Martensson |
| 6,763,643 B1 | 7/2004 | Martensson |
| 6,802,166 B1 | 10/2004 | Durnberger |
| 6,854,235 B2 | 2/2005 | Martensson |
| 6,880,307 B2 | 4/2005 | Schwitte et al. |
| 7,040,068 B2 | 5/2006 | Moriau et al. |
| 7,051,486 B2 | 5/2006 | Pervan |
| 7,127,860 B2 | 10/2006 | Pervan et al. |
| 7,171,791 B2 | 2/2007 | Pervan |
| 7,637,068 B2 | 12/2009 | Pervan |
| 7,677,005 B2 | 3/2010 | Pervan |
| 7,757,452 B2 | 7/2010 | Pervan |
| 7,762,293 B2 | 7/2010 | Pervan |
| 7,841,150 B2 | 11/2010 | Pervan |
| 8,495,849 B2 | 7/2013 | Pervan |
| 8,511,031 B2 | 8/2013 | Bergelin et al. |
| 8,631,622 B2 | 1/2014 | Baert et al. |
| 8,733,410 B2 | 5/2014 | Pervan |
| 8,931,174 B2 | 1/2015 | Pervan et al. |
| 9,314,888 B2 | 4/2016 | Pervan et al. |
| 9,816,270 B2 | 11/2017 | Pervan et al. |
| 10,279,404 B2 | 5/2019 | Pervan et al. |
| 10,500,684 B2 | 12/2019 | Pervan et al. |
| 10,697,175 B2 | 6/2020 | Pervan et al. |
| 2002/0025232 A1 | 2/2002 | Miller |
| 2002/0057942 A1 | 5/2002 | Hamberger et al. |
| 2003/0037504 A1 | 2/2003 | Schwitte et al. |
| 2003/0140478 A1 | 7/2003 | Olofsson |
| 2003/0154681 A1 | 8/2003 | Pletzer et al. |
| 2003/0180091 A1 | 9/2003 | Stridsman |
| 2004/0016196 A1 | 1/2004 | Pervan |
| 2004/0035078 A1 | 2/2004 | Pervan |
| 2004/0206036 A1 | 10/2004 | Pervan |
| 2004/0211143 A1 | 10/2004 | Hannig |
| 2005/0016107 A1 | 1/2005 | Rosenthal et al. |
| 2005/0034405 A1 | 2/2005 | Pervan |
| 2005/0160694 A1 | 7/2005 | Pervan |
| 2005/0166514 A1 | 8/2005 | Pervan |
| 2005/0252130 A1 | 11/2005 | Martensson |
| 2006/0070333 A1 | 4/2006 | Pervan |
| 2007/0028547 A1 | 2/2007 | Grafenauer et al. |
| 2007/0175148 A1 | 8/2007 | Bergelin |
| 2008/0041008 A1 | 2/2008 | Pervan |
| 2008/0134607 A1 | 6/2008 | Pervan |
| 2008/0168737 A1 | 7/2008 | Pervan |
| 2008/0172856 A1 | 7/2008 | Brouckaert |
| 2008/0216434 A1 | 9/2008 | Pervan |
| 2008/0216920 A1 | 9/2008 | Pervan |
| 2009/0038254 A1 | 2/2009 | Steele et al. |
| 2009/0049792 A1 | 2/2009 | Capelle et al. |
| 2009/0101236 A1 | 4/2009 | Boucke |
| 2009/0133353 A1 | 5/2009 | Pervan et al. |
| 2009/0223600 A1 | 9/2009 | Tappan |
| 2009/0260313 A1 | 10/2009 | Segaert |
| 2010/0170189 A1 | 7/2010 | Schulte |
| 2011/0023302 A1 | 2/2011 | Pervan et al. |
| 2011/0023303 A1 | 2/2011 | Pervan et al. |
| 2011/0030303 A1 | 2/2011 | Pervan et al. |
| 2011/0209430 A1 | 9/2011 | Pervan |
| 2012/0174521 A1 | 7/2012 | Schulte |
| 2013/0333182 A1 | 12/2013 | Pervan et al. |
| 2014/0223852 A1 | 8/2014 | Pervan |
| 2015/0107079 A1 | 4/2015 | Pervan et al. |
| 2016/0221212 A1 | 8/2016 | Pervan et al. |
| 2017/0254076 A1 | 9/2017 | Pervan et al. |
| 2020/0284034 A1 | 9/2020 | Pervan et al. |

FOREIGN PATENT DOCUMENTS

| | | |
|---|---|---|
| DE | 142 293 C | 7/1902 |
| DE | 2 159 042 | 6/1973 |
| DE | 23 37 254 A1 | 2/1975 |
| DE | 33 43 601 A1 | 6/1985 |
| DE | 33 43 601 C2 | 6/1985 |
| DE | 42 15 273 A1 | 11/1993 |
| DE | 42 42 530 A1 | 6/1994 |
| DE | 196 01 322 A | 5/1997 |
| DE | 200 02 744 U1 | 8/2000 |
| DE | 100 48 679 A1 | 12/2001 |
| DE | 102 41 769 B3 | 4/2004 |
| DE | 10 2010 024 513 A1 | 12/2011 |
| EP | 1 048 423 A2 | 11/2000 |
| EP | 1 120 515 A1 | 8/2001 |
| EP | 1 146 182 A2 | 10/2001 |
| EP | 1 754 582 A1 | 2/2007 |
| EP | 1 349 995 B1 | 1/2008 |
| FR | 2 810 060 A1 | 12/2001 |
| JP | H06-146553 A | 5/1994 |
| PL | 197 416 B1 | 3/2008 |
| WO | WO 94/26999 A1 | 11/1994 |
| WO | WO 96/27721 A1 | 9/1996 |
| WO | WO 97/47834 A1 | 12/1997 |
| WO | WO 99/66151 A1 | 12/1999 |
| WO | WO 99/66152 A1 | 12/1999 |
| WO | WO 00/20705 A1 | 4/2000 |
| WO | WO 00/20706 A1 | 4/2000 |
| WO | WO 00/47841 A1 | 8/2000 |
| WO | WO 01/53628 A1 | 7/2001 |
| WO | WO 01/75247 A1 | 10/2001 |
| WO | WO 02/055809 A1 | 7/2002 |
| WO | WO 02/055810 A1 | 7/2002 |
| WO | WO 03/012224 A1 | 2/2003 |
| WO | WO 03/083234 A1 | 10/2003 |
| WO | WO 2004/079130 A1 | 9/2004 |
| WO | WO 2005/068747 A1 | 7/2005 |

(56) References Cited

FOREIGN PATENT DOCUMENTS

| WO | WO 2006/043893 A1 | 4/2006 |
|----|-------------------|--------|
| WO | WO 2007/015669 A2 | 2/2007 |
| WO | WO 2008/004960 A2 | 1/2008 |
| WO | WO 2008/064692 A1 | 6/2008 |
| WO | WO 2009/016446 A2 | 2/2009 |
| WO | WO 2009/020949 A1 | 2/2009 |
| WO | WO 2009/116926 A1 | 9/2009 |
| WO | WO 2010/015138 A1 | 2/2010 |

OTHER PUBLICATIONS

U.S. Appl. No. 15/602,345, Darko Pervan and Ågne Pålsson, filed May 23, 2017 (cited herein as US Patent Application Publication No. 2017/0254076 A1 of Sep. 7, 2017).
International Search Report issued in PCT/SE2010/050795, dated Jan. 4, 2011, Swedish Patent Office, Stockholm, SE, 8 pages.
Extended European Search Report issued in EP Application No. 10804789.5, dated Apr. 21, 2017, European Patent Office, Munch, DE, 7 pages.
"What is Broaching Used for?", http://www.wisegeek.com/what-is-broaching-used-for.htm, 1 page.
Gronlund, Anders, *Träbearbetning*, 1986, ISBN 91-970513-2-2, pp. 16-23, published by Institutet for Trateknisk Forskning, Stockholm, Sweden, with Summary Translation.
Laminate Flooring Tips (http://flooring.lifetips.com/cat/61734/laminate-flooring-tips/index.html). Copyright 2000. 12 pages.
U.S. Appl. No. 16/738,737, Roger Ylikangas, Anders Nilsson and Karl Quist, filed Jan. 9, 2020.
U.S. Appl. No. 16/883,071, Darko Pervan and Agne Pålsson, filed May 26, 2020, (Cited herein as US Patent Application Publication No. 2020/0284034 A1 of Sep. 10, 2020).
U.S. Appl. No. 16/738,737, Ylikangas, et al.
U.S. Appl. No. 16/738,737 entitled "Building Panel," filed Jan. 9, 2020.

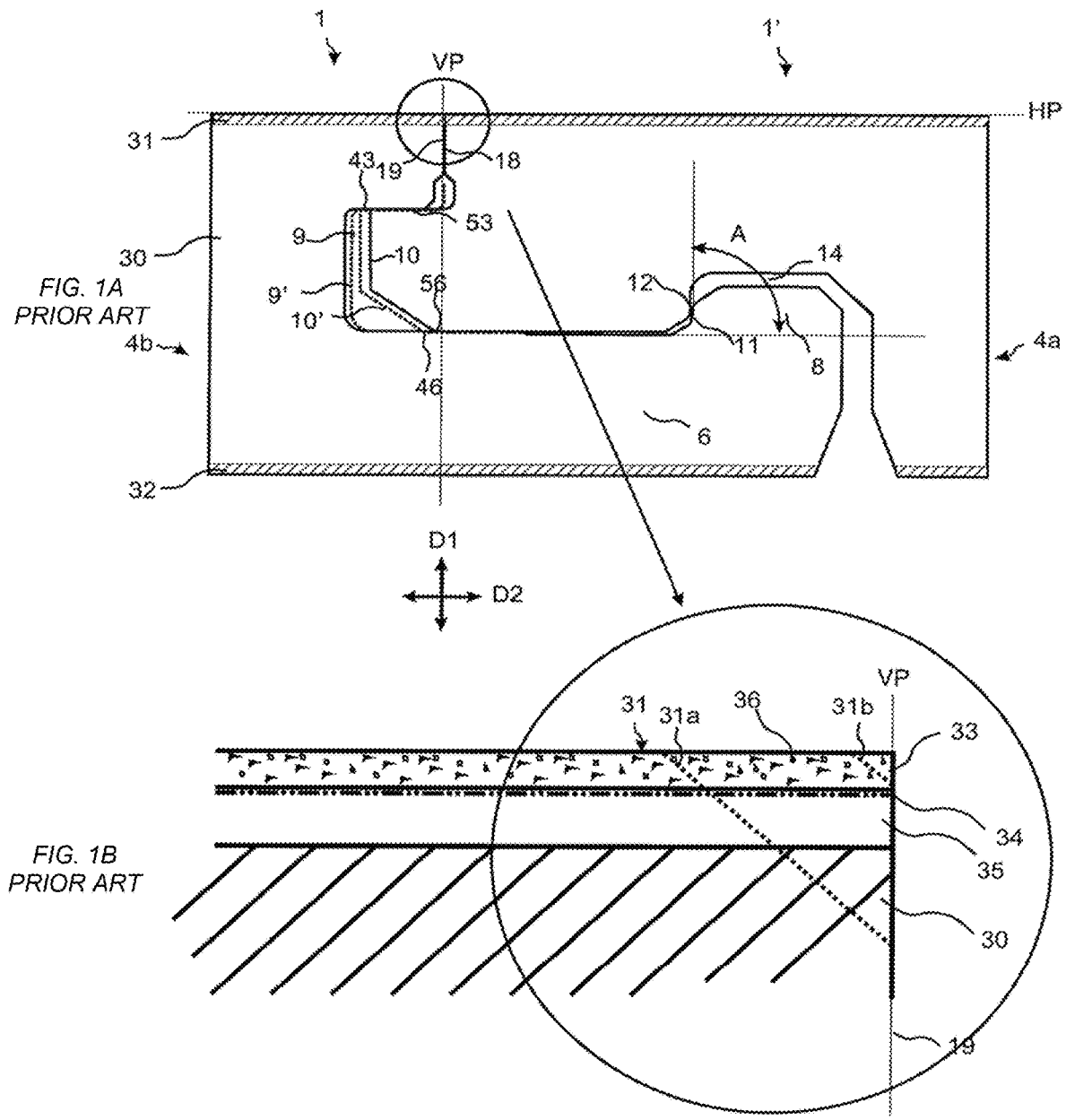

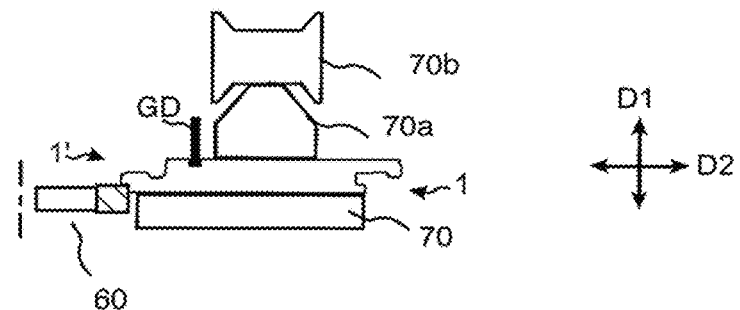
FIG. 4A PRIOR ART
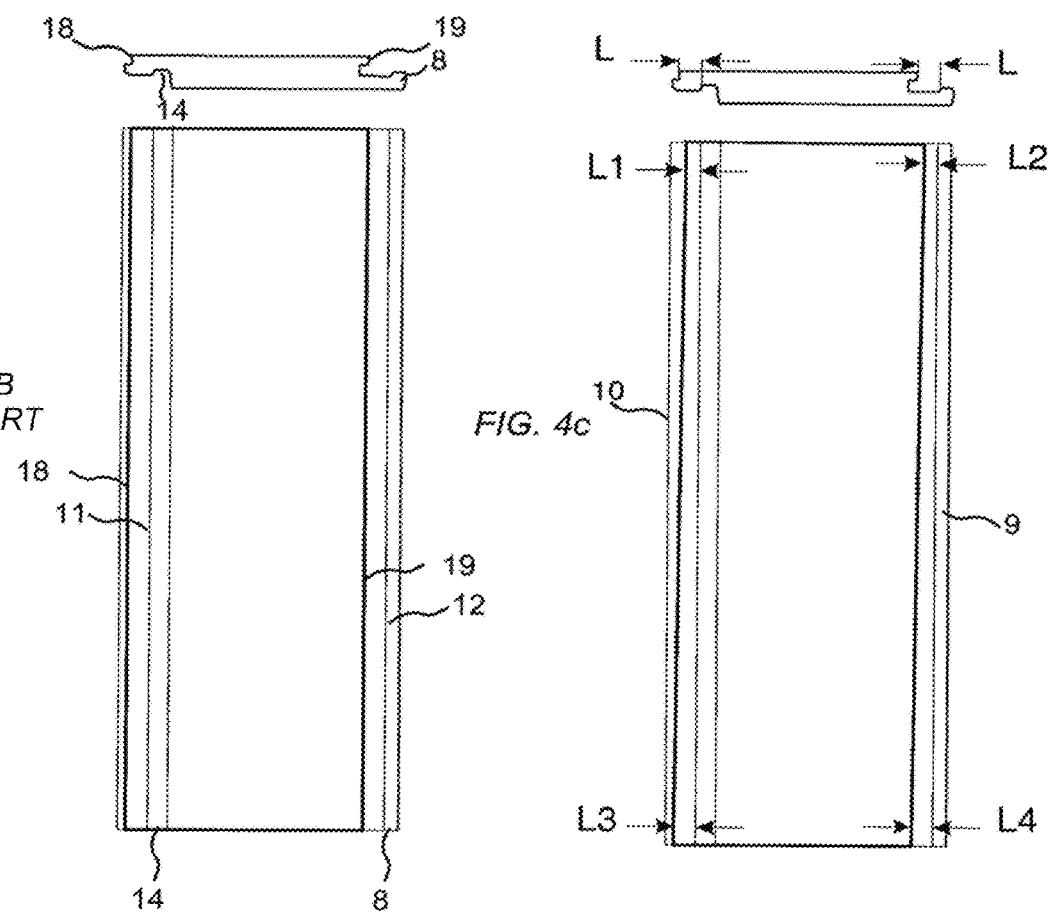
FIG. 4B PRIOR ART
FIG. 4c

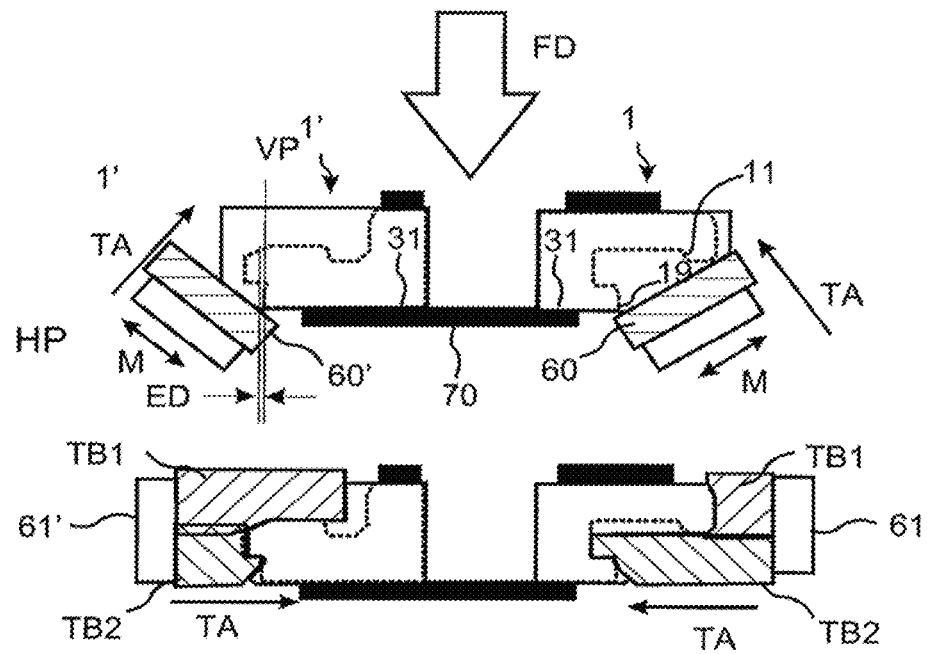
FIG. 5A PRIOR ART
FIG. 5B PRIOR ART
FIG. 5C PRIOR ART
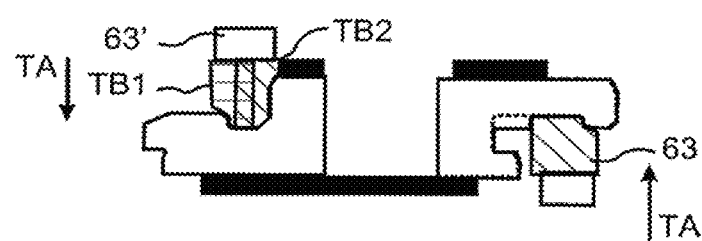
FIG. 5D PRIOR ART
FIG. 5E PRIOR ART
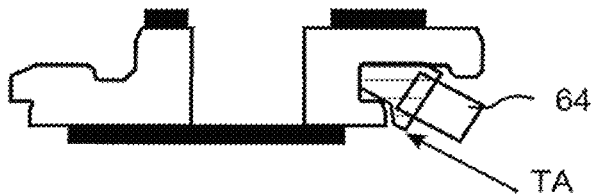

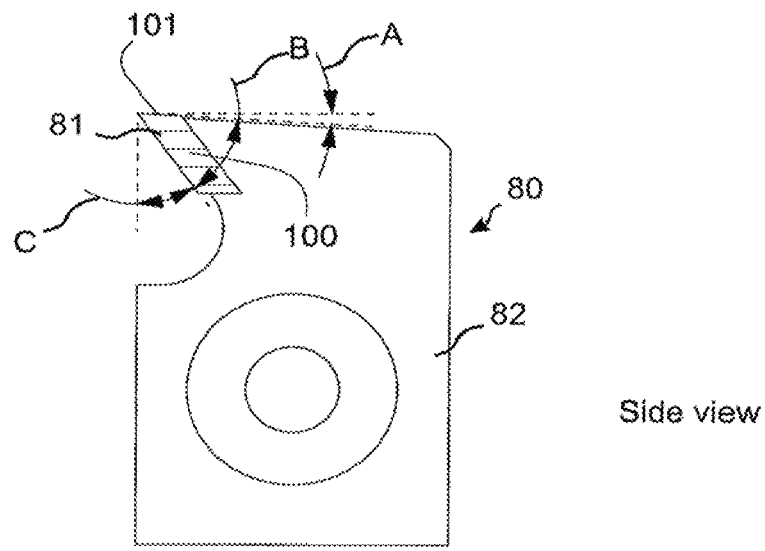
FIG. 10A  Side view
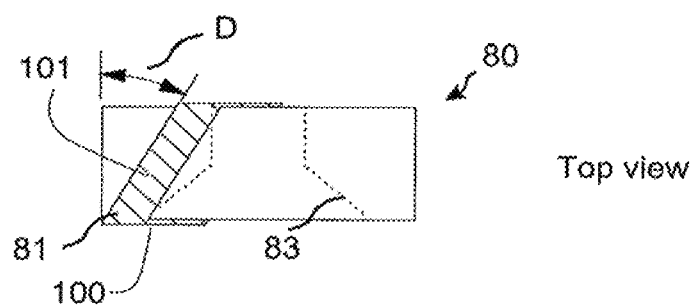
FIG. 10B  Top view
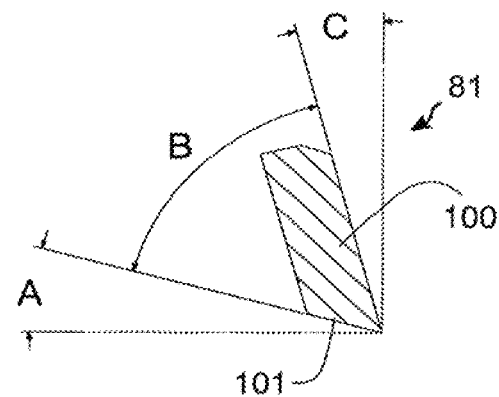
FIG. 10C

METHODS AND ARRANGEMENTS RELATING TO EDGE MACHINING OF BUILDING PANELS

CROSS REFERENCE TO RELATED APPLICATIONS

The present application is a continuation of U.S. application Ser. No. 12/832,752, filed on Jul. 8, 2010, which claims the benefit of U.S. Provisional Application No. 61/234,480, filed on Aug. 17, 2009, and the benefit of Swedish Application No. 0901053-9, filed on Jul. 31, 2009. The entire contents of each of U.S. application Ser. No. 12/832,752, U.S. Provisional Application No. 61/234,480, and Swedish Application No. 0901053-9 are hereby incorporated herein by reference in their entirety.

TECHNICAL FIELD

The present invention generally relates to the field of mechanical locking of floor panels. Specifically, the present invention relates to a carving or scraping tool configuration as well as the method for producing improved locking systems for mechanical locking of floor panels using that carving or scraping tool configuration.

FIELD OF THE APPLICATION

The present invention is particularly suited for use in floating floors with a mechanical locking system at the edges, having a wear resistant top surface layer, e.g. laminate floors with a surface layer of high pressure laminate or direct laminate, mineral granulate coated floorboards, wood fiber mix and the like. The following description of prior art technique, problems of known systems as well as objects and features of the invention will therefore as non-limiting examples be aimed mainly at this field of application and to the profiling of mechanical locking systems on long edges. However, it should be emphasized that the invention can be used in any floor panels or wall panels, which are intended to be joined by means of a mechanical locking system. The invention can be used to form long and/or short edges, square panels and panels with more than four edges.

Definition of Some Terms

In the following text, the visible surface of the installed floor panel is called "front side", while the opposite side of the floor panel facing the subfloor is called "rear side". "Horizontal plane" relates to a plane which is parallel to the front side. Directly adjoining upper parts of two neighboring joint edges of two joined floor panels together define a "vertical plane" perpendicular to the horizontal plane. The outer parts of the floor panel at the edge of the floor panel between the front side and the rear side are called "joint edge". As a rule, the joint edge has several "joint surfaces" which can be vertical, horizontal, angled, rounded, beveled etc. These joint surfaces exist on different materials, for instance laminate, fibreboard, wood, plastic, metal (in particular aluminum) or sealing materials.

By "locking" or "locking system" are meant cooperating connecting means which interconnect the floor panels vertically and/or horizontally. By "mechanical locking system" is meant that locking can take place without glue. Mechanical locking systems can in many cases also be joined by glue.

By "vertical locking" is meant locking parallel to the vertical plane and by "horizontal locking" is meant locking parallel to the horizontal plane.

By "vertical locking surfaces" is meant the upper and lower cooperating tongue surfaces in the tongue in a first edge cooperating with upper and lower cooperating tongue groove surfaces in the tongue groove in an adjacent second edge locking the adjacent edges vertically.

By "horizontal locking surfaces" is meant an essentially vertical upper tongue groove edge and a locking element in the second edge cooperating with an essentially vertical upper tongue edge and a locking groove in the adjacent first edge, the cooperating horizontal locking surfaces lock the adjacent edges horizontally perpendicularly to the edge and prevent that the adjacent edges can be displaced inwardly towards each other and outwardly away from each other.

By "locking groove side" is meant the side of the floor panel in which part of the horizontal locking consists of a locking groove whose opening faces to the rear side. By "locking element side" is meant the side of the floor panel in which part of the horizontal locking consists of a locking element, which cooperates with the locking groove.

By "locking angle" is meant the angle of the locking surfaces of the horizontal locking relative to the horizontal plane. In the cases where the locking surfaces are curved, the locking angle is the tangent to the curve with the highest angle By "tool angle" is meant the angle of the plane in which a tool rotates.

By "decorative surface layer" is meant a surface layer, which is mainly intended to give the floor its decorative appearance. "Wear resistant surface layer" relates to a high abrasive surface layer, which is mainly adapted to improve the durability of the front side. This concludes in that a "decorative wear resistant surface layer" is a layer, which is intended to give the floor its decorative appearance as well as improve the durability of the front side. A surface layer is applied to the core.

By "broaching" or "scraping" is meant a method to form a groove or a protrusion on an edge of a panel by molding a substantial part of the edge with rotating tools and then fine molding a part of the edge to its final shape by a broaching or scraping tool configuration comprising several non-rotating and fixed chip-removing surfaces located along the feeding direction.

By "carving" is meant a method to form a groove or a protrusion on an edge of a panel by carving a substantial part of the edge to its final shape by one or several carving tool configurations comprising several non-rotating and fixed chip-removing surfaces located along the feeding direction.

Background

To facilitate the understanding and description of the present invention as well as the knowledge of the problems behind the invention, here follows a description of both the basic construction and the function of floor panels, as well as the basic production of such floor panels with reference to FIGS. 1-8 in the accompanying drawings. This basic construction and function as well as production are also completely or in parts used in the present invention.

A mechanical locking system comprises a tongue and a tongue groove for vertical locking and a locking element and a locking groove for horizontal locking. It has at least four pairs of active cooperating locking surfaces, two pairs for vertical locking and two pairs for horizontal locking. The locking system comprises several other surfaces, which generally are not in contact with each other and can therefore be produced with considerably larger tolerance then the cooperating locking surfaces.

Laminate floorings are usually composed of a core consisting of a 6-9 mm fibreboard, a 0.20 mm thick upper surface layer and a lower balancing layer. The upper surface layer provides appearance and durability to the floor panels. The core provides stability and the balancing layer keeps the board levelled when the relative humidity (RH) varies during the year.

The mechanical locking systems are generally formed by machining the core of the board. Such machining must be very precise in order to ensure a high quality. It is especially important that the cooperating vertical and horizontal locking surfaces are formed with high precision in order to ensure easy installation and a precise fit between adjacent edges.

FIG. 1A illustrates according to prior art a mechanical locking systems (strip lock), which can be locked with angling and which is widely used on the market. Such a locking system can also be designed to be locked with vertical or horizontal snapping. A vertical cross-section of the floor panel is shown of a part of a long side 4a of the floor panel 1, as well as a part of a long side 4b of an adjoining floor panel 1. The bodies of the floor panels 1, 1' can be composed of a fibreboard body or core 30, which supports here, a wear resistant and decorative surface layer 31 on its front side and a balancing layer 32 on its rear side (underside). The locking system has a tongue 10 and a tongue groove 9 which locks the panels in a vertical direction D1 with upper 53 and lower 56 tongue surfaces that cooperate with upper 43 and lower 46 tongue grooves surfaces. A strip 6 is formed from the body and balancing layer 32 of the floor panel 1 and supports a locking element 8 on a locking element side 4b. Therefore the strip 6 and the locking element 8 in a way constitute an extension of the lower part of the tongue groove 46. The locking element 8 formed on the strip 6 has an operative locking element surface 11 which cooperates with an operative locking groove surface 12 in a locking groove 14 in the opposite locking groove side of the adjoining floor panel 1'. By the engagement between the horizontal operative locking surfaces 11, 12 a horizontal locking of the floor panels 1, 1' transversely of the joint edge (direction D2) is obtained that prevents separation of the adjacent edges outwardly if the panels are pulled apart. The locking angle A of the locking surfaces 11, 12 is in this shown embodiment 90 degrees and this gives a very strong horizontal locking. Locking systems are also formed with other locking angles for example 45-60 degrees. Some locking systems have a very low locking angle for example 30 degrees. Low locking angles makes it possible to make very compact locking systems and to save material. The locking strength of such systems is however very low. The upper part of the locking element side 1' comprises a first upper edge 18 and the upper part of the locking groove side 1 comprises a second upper edge 19 that are preventing a horizontal movement of the adjacent edges inwardly against each other if the panels are pressed together.

FIG. 1B shows a laminate surface layer, which consist of a transparent overlay 33 with wear resistant particles of aluminum oxide 36, and a decorative paper layer 35 with a print 34 giving the surface its decorative properties. The print, which in most cases is a wood design, has generally a white base layer, which is not visible in a floor panel with straight and vertical upper edges. Some floor panels are formed with decorative bevels 31a which are covered with paint or a decorative tape. It is also known that a part of the overlay 31b could be machined as a small bevel in order to make the edge softer and to remove edge chipping which could occur if the tools are not sharp. Such a machining of the overlay is made as a final step after the machining of the surface layer and the upper edge with processes similar to sanding operations.

A locking system (tongue lock) could also be formed without a strip 6 as shown in FIG. 2A. The locking element 8 is in this embodiment located on the tongue 10 and the locking groove 14 is formed as an undercut groove in the tongue groove 9.

A locking system could also be formed with a flexible tongue 10a (fold lock), which could be displaced during locking. Such a locking system, as shown in FIG. 2B, could be locked with a vertical movement.

A locking system (hook lock) could also be formed without a tongue, as shown in FIG. 2C, in order to lock only in the horizontal direction D2. Such a locking system is used on the short sides of narrow floor panels. The vertical locking in the vertical direction D1 is accomplished with the long sides of adjacent panels.

All of these known locking systems, which are used to lock panels horizontally, have two pairs of cooperating surface 18, 19 and 11, 12, which must match each other in a precise manner in order to work properly.

FIG. 3A (side view) and 3B (top view) illustrates the most used method to produce a locking system and the main problems related to such production. The locking system is formed with the surface 31 of the floor panel pointing downwards. Several rotating tool configurations 60 are used to profile the edges when a floor panel 1 is displaced horizontally in a linear feeding direction by a chain 70. A belt 70a supported by pressing wheels 70b is used to create a vertical pressure against the chain. The belt has no stability in the horizontal D2 direction perpendicularly to the feeding direction. The vertical D1 and horizontal position D2 of the floor panel is obtained by the chain, which moves with high precision in relation to the rotating tool configurations. The surface layer of the floor panel is fixed to the chain with friction.

FIG. 4A shows a floor panel 1, 1' which is produced with a profiling equipment comprising one chain 70, a belt 70a supported by pressing wheels 70b creates a vertical pressure against the chain. FIG. 4B shows that perfect machining can form very precise grooves 14, locking elements 8 and upper edges 18, 19, which in theory are almost completely parallel. The production tolerances can be as low as +−0.02 mm. In practice, it is however very difficult to reach such tolerances. The reason is that the friction between the chain and the floor surface is not sufficient and the floor panel is moving or turning horizontally perpendicularly to the feeding direction during the production (hereafter referred to as horizontal turning). The belt, the chains, especially if they are not parallel, the tools and pressure shoes, which also are used (not shown), creates uncontrolled horizontal side pressures against the floor panel and the above mentioned parts of the locking system will not be formed completely parallel as shown in FIG. 4C. The distances L1, L2 between the upper part of the floor panel 18, 19 and the locking surfaces 11, 12 at one part of the panel can for example be 0.1-0.2 mm smaller than the corresponding distances L3, L4 at another part of the same panel. The locking can be too tight or to loose. The tongue 10 and the tongue groove 9 can also vary in the horizontal direction. Such tolerances 10', 9' as shown in FIG. 1A does not cause any problems however since the locking system is formed with spaces between the tip of the tongue and the inner part of the groove and such spaces are used to compensate the above mentioned production tolerances.

Several methods have been used to solve problems related to horizontal turning. The most used methods are to make the profiling equipment more stable with improved guiding of the chains. Cleaning devices are also used to clean the chain in order to maintain high friction between the chain and the floor panel. Special guiding devices GD as shown in FIG. 4A, such as steal rulers, which cooperate with special grooves on the rear side of the panel, have been used to prevent horizontal turning. Such rulers and grooves are difficult to adjust, they create wear and heat during production and can create stability problems when a balancing layer is separated by a groove.

All these efforts to improve the profiling equipment have however not solved the problems. On the contrary the problems of horizontal movement have increased over the years. One reason is that the production speed has increased and this creates stronger side pressure. Floor panels with smaller sizes, deep surface embossing and glossy surfaces have been developed and this decreases the friction between the chain and the floor surface and increases the risk for a considerable uncontrolled horizontal turning.

Other methods, which also have been introduced, are based on the principle to use tool design and tool positions to decrease horizontal turning. This is shown in FIGS. 5 and 6.

FIGS. 5A-5E show traditional tool setup solutions for producing floor panels with a wear resistant top surface layer. The floor panel is moving in the feeding direction FD of the arrow during the profiling of the edges. The first step in the profiling line is illustrated in FIG. 5A and the last step in FIG. 5E. The cross-section of floor panel 1, 1' is shown, positioned with the top surface layer 31 downwards on a ball bearing chain 70 in a milling machine. A traditional machining setup conveys the board 1, 1' with great accuracy past a number of independently rotating cutting tools. The cutting tools have generally a tool diameter of approximately 200-250 mm and can be set at an optional tool angle TA to the horizontal plane HP of the board. The tools are mounted on opposite sides of several columns. The distance between the tools TD is about 0.5 m and the distance between the columns is about 1 m as shown in FIGS. 3A-3B. Each tool 60-64, 60'-63' is dedicated to remove a limited part of the joint edge, where some are also forming the final joint surfaces. Several tools are positioned along both sides of the profiling line in the feeding direction FD of the floor panel 1, 1'. This is done in order to obtain sufficient production tolerances. A general rule is that an increase in number of tools result in improved production tolerances since each tool removes less material and creates lower forces that can displace the floor panel in an uncontrolled way. The normal production mode is to use 4-6 opposite tool pairs, on a first machine cutting the long side, followed by a similar machine cutting the short side locking system on the panel.

The horizontal locking surfaces 18, 19, 11, 12 are machined with 4 independent tools 62, 62' and 63, 63'. A horizontal turning between the third (FIG. 5C) and the fourth (FIG. 5D) tool stations on each side will create horizontal locking surfaces 18, 19, 11, 12 which are not parallel as shown in FIG. 4C.

Traditionally, when producing mechanical locking systems in a floor panel, rough cutting tools 60, 60', as illustrated in FIG. 5A, or the fine cutting tools 62, 62', as illustrated in FIG. 5C, are positioned at one independent profiling position on one side of the feeding direction FD of the floor panel 1 and on the opposite side as opposite pairs. One tool of the pair is machining the locking element side 1, and the other tool is machining the locking groove side 1'. The rough cutting tools 60, 60' are removing the majority of the high abrasive material of the wear resistant surface layer in order to increase the life and the cutting quality of the next coming tools, with the exception of tool 62, 62' that also cut in the wear resistant surface layer. The cutting edges of the tools consist of diamond, but even so, the running time of such a tool is limited, normally not more than 5 000-20 000 meters when cutting in a high abrasive top layer. Because of this, the tools that cut the surface layer, the rough cutting tools 60, 60', as illustrated in FIG. 5A, and the fine cutting tools 62, 62', as illustrated in FIG. 5C are configured with a straight cutting edge that can be moved M stepwise parallel to the cutting edge during production in order to bring a fresh tool cutting edge into a cutting position.

Such a horizontal rotation with a horizontal tool angle TA and a stepwise vertical adjustment M is shown in FIGS. 6A-6C. FIG. 6A shows the chip-removing surface 71 of the fine cutting tool 62 that is forming the top surface layer 31 of the floor panel 1. If the board have a wear resistant top surface layer the fine cutting tool is worn down much faster compared to cutting in the core of the board, e.g. high density fiber board (HDF). The result is a worn down portion of the cutting surface 73 as shown in FIG. 6B on the tool 62, which results in so-called chipping of the top edge portion of the panel 72, i.e. small cracks occur and the edge becomes rough and small white portions from the base layer of the print can show. FIG. 6C illustrates how the fine cutter 62 is moved in small steps in the vertical direction M some few tenth of a millimeter, so that a fresh cutting portion 74 of the tool 62 is in position against the top surface 31. A similar principle is used for the rough cutters and the stepwise movement of the tools is done while the machine is running in order not to lose running time in the line.

The rough cutting tools 60 in FIG. 5A are generally positioned with a distance ED of approximately 0.5 mm from the vertical plane VP and from the final upper edge 18, 19. All next coming cutting tools, except the fine cutters 62 are all designed such that their cutting teeth will keep a safe distance to the surface layer in the upper edge in order to avoid the risk of cutting into the wear resistant surface layer 31 and thereby avoid that they wear down fast, especially since these tools cannot be moved stepwise.

The horizontal turning inside the profiling machine is to a large extent related to the fact that the tools create uncontrolled side pressures on the panels. Such side pressures can occur if tools work with different tool angles, different rotations (with or against the feeding direction) or if they remove different amounts of material or material with different composition (core, surface layer).

The boards 1, 1' are generally more unstable and the risk for horizontal turning is high in the first and the last cutting position, relative to the other tool positions due to several reasons. For example the board is only clamped by the chain and the belt over a limited length and the inlet/outlet equipment may push the boards slightly.

The machining of the cooperating horizontal locking surfaces 11, 12, 18, 19 are therefore generally positioned at the inner tool positions in conjunction to each other. They are formed by fine cutters 62, 62' in FIG. 5C and locking groove cutter 63', locking element cutter 63 in FIG. 5D. The fine cutters 62, 62' in FIG. 5C are generally always positioned after the tools that form the tongue and the tongue groove as shown in FIG. 5B. This is a major advantage since a majority of the material is already removed by the previous tools 60, 60', 61, 61' when the fine cutters start to remove material. The fine cutters 62, 62' must only remove a very limited amount of the core material and the last part of the wear resistant surface layer 31. This makes it possible to obtain tight machining tolerances, by reducing the cutting forces and the horizontal pressure on the floor panel.

The rough cutters 60, 60' and the fine cutters 62, 62' are as described above always separated with several tool positions in between. This causes a substantial uncontrolled horizontal turning between the rough cutters 60, 60' and the fine cutters 62, 62' and such turning can be about 0.2 mm. The rough cutters must therefore be position at a safe distance, generally at least 0.5 mm, from the final surface edge, in order to avoid quality problems such as chipped edges, white visible lines of decor paper and core exposure.

The locking surfaces of the locking groove and locking element are formed with rotating tool 63, 63' having a tool angle equal or larger than the locking angle. A rotating tool forming a locking surface with a locking angle A can never work with a tool angle TA which is lower than the locking angle A. This fact is a considerable limitation, which must be considered in the design and production of the locking systems.

The horizontal and vertical locking tools 61, 61', 63, 63' in FIGS. 5B and 5D are all examples of a rotation tool consisting of two in relation to each other adjustable tool bodies TB1 and TB2 mounted on the same shaft. Such tools are hereafter referred to as COMBI tools. These COMBI tools are needed when the tool is forming a geometry, e.g. a groove, that consist of two opposite cutting surfaces with a fixed relative distance between each other. When the tool is sharpened, then some of the material of the tool is removed and the relative distance between the opposite edges is changed. The two bodies can therefore be adjusted to an oversize dimension and then be grinded into a correct relative dimension. A positive effect of these COMBI tools is that the accuracy between the two profiled surfaces formed by the two tool bodies is very accurate since it is profiled at the same position and with the same tool. Such COMBI tools 61' can be used to improve the tolerances between a pair of the vertical locking surfaces of the tongue, as shown in FIG. 5B. COMBI tools are however not used to produce a pair of the horizontal locking surfaces. One reason is that the upper edge on the locking grove side must be formed with a tool body 62' having a tool angle which is different to the tool angle of the tool body 63' forming the locking surface in the locking groove as shown in FIGS. 5C and 5D. The tool bodies of a COMBI are always working with the same tool angle since they are fixed on the same shaft. Another reason is the fact that one of the tool bodies 62, which forms the upper edge, must work horizontally and must be adjustable stepwise vertically. A COMBI tool cannot be adjusted stepwise vertically since such an adjustment will at the same time change the position of the other tool body 63, which is used to form the locking surface of the locking element. A COMBI tool with two tool bodies on the same shaft has therefore two major limitations. Both tool bodies must work with the same tool angle and must be displaced in the same direction at the same time.

FIG. 7A-B illustrate according to prior art, a rotating tool configuration 62 in a close-up perspective view. FIG. 7C illustrates according to prior art, a floor panel 1 in a close-up perspective view after machined by the rotating tool 62 in FIGS. 7A-B. Examples of rotating tool configurations 60-64, 60'-63' positioned in a production line can be seen in FIGS. 5A-5E. TABLE 1 illustrates exemplary data for the rotating tool configuration in FIGS. 7A-B.

TABLE 1

| Rotating tool | Values |
| --- | --- |
| circumference ⌀ | 250 mm |
| revolution n | 6000 rpm |
| speed v | 78.5 m/s |
| distance t | 0.83 mm |

The rotating tool configuration 62 have its chip-removing surfaces 71 positioned around a wheel, and each chip-removing surface 71 "hit" into the material 1 to be removed. FIG. 7C shows the result, small cut marks H1-H3 in the profiled surface. Each chip-removing surface 71 wear down fast because of the instant periodic movements, intermittent movements of the chip-removing surface "hitting" into the material. If the rotating tool configuration in TAB.1 rotates with 6000 rpm giving a rotating speed of 78 m/s, and if chip-removing surfaces are positioned with a distance of 1 mm from each other, every sec 78,000 chip-removing surfaces will "hit" into the edge of the floor panel.

The clearance angle A in FIG. 7B in a rotating tool configuration cannot be too small, as the back of the chip-removing surface will then "hit" into the profiled surface when the chip-removing surface is leaving, rotating out of the surface. This is a limitation. To cut with an optimal cutting angle B means that as little force as possible is used in removing material and is dependent on the material to be removed.

Rotating tool configurations are driven by tool motors which is a big cost of the total investment in a production line, they are also energy consuming, have a complicated electrical control system, and require a lot of maintenance. Rotating tools produce a lot of dust that have to be extracted. The dust comprises of a mixture of removed ships and dust. A disadvantage of even a sophisticated dust extraction system for rotating tool configurations is that it is always a fraction of dust and chips that goes in to the transport system and causes wear and affects the precision of the transport system in a negative way. Affecting the tolerances of a mechanical locking system in a negative way.

The opposite to a rotating tool is a fixed tool configuration, where broaching or commonly known as scraping, is a technique where for example a rotating tool forms a major part of a groove and a fraction of material is thereafter removed by scraping with a fixed tool. Such forming is mainly used to make undercuts or angles, which are difficult or impossible to form with large rotating tools. Such production methods are described in WO 02/060691. FIG. 8 illustrates another of such production method according to WO 03/012224. The undercut groove 43 in the locking system is machined as in metal working, by moving the panel past a stationary grooving tool 89 which in this embodiment has chip-removing surfaces 81a-d on fixture 84 which operates perpendicular to the surface layer 31. When the floor panel 1 moves in the feeding direction of the arrow FD, the floor panel 1 will pass the grooving tool 89 which is inserted into the tongue groove 9 and the teeth 81a-d of which make the final forming of the undercut groove 46 with its locking surface. The major part of the tongue groove 9 is formed in a conventional manner using large rotating configuration tools before the panel comes to such a position that the grooving tool 89 is operative.

The main challenge while machining a mechanical locking, apart from overall production cost, is to obtain sufficient production tolerances, i.e. to get a proper geometry of the locking system and to do this in a cost efficient production mode. Accordingly, it would be highly desirable in the manufacturing of floor panels to reduce the horizontal locking tolerances further to a considerably lower level and in a more cost effective and easy way.

Summary and Objects

A main objective of this invention is enabling reduced production tolerances e.g. in the horizontal locking of floor panels.

An objective of an exemplary embodiment of this invention is enabling improved production of mechanical locking systems by decreasing the size of the production equipment, decreasing the tool maintenance and the energy consumption.

According to a first aspect of the invention a method for producing mechanical locking systems in a floor panel comprising a top surface layer, a core and a mechanical locking systems on a first and second edge for horizontal locking of the floor panel with similar other panels. The mechanical locking system comprising a first pair of locking surfaces in the first edge of a panel and a second pair of locking surfaces in the opposite second edge. The first pair of locking surfaces comprises a locking surface on a first upper edge and on a locking groove. The second pair of locking surfaces comprises a locking surface on a second upper edge and on a locking element, is displaced in a feeding direction relative fixed chip-removing surfaces located along the feeding direction. The method comprises forming on either the first or the second edge by the fixed chip-removing surfaces at least a part of the first or second pair of locking surfaces that locks the adjacent edges horizontally and prevents a displacement of the joint edges outwardly away from each other and inwardly against each other.

The invention offers the advantages that at least one pair of locking surfaces can be formed by non-rotating tools. Such tools cold be positioned very close to each other and tolerances related to horizontal turning can be prevented or completely eliminated in one edge if for example the locking surface of the locking element and the upper edge are formed by non-rotating tools that can be positioned very close to each other. It is an advantage if these surfaces preferably are formed by the same tool configuration.

In an exemplary embodiment of the first aspect, the first and the second pairs of horizontal surfaces are both formed by carving and/or broaching. The first pair and the second pair can each preferably be formed by one tool and such forming will eliminate substantially all tolerances related to horizontal turning.

According to a second aspect of the invention a tool configuration for producing mechanical locking systems in a floor panel comprising a top surface layer, a core and a mechanical locking systems on a first and second edge for horizontal locking of the floor panel with similar other panels. The mechanical locking system comprising a first pair of locking surfaces in the first edge of a panel and a second pair of locking surfaces in the opposite second edge. The first pair of locking surfaces comprises a locking surface on a first upper edge and on a locking groove, the second pair of locking surfaces comprises a locking surface on a second upper edge and on a locking element. The tool configuration comprises fixed chip-removing surfaces located along the feeding direction. The floor panel is displaced in a feeding direction relative the fixed chip-removing surfaces located along the feeding direction. The fixed chip-removing surfaces for forming on either the first or the second edge at least a part of the first or second pair of locking surfaces that locks the adjacent edges horizontally and prevents a displacement of the joint edges outwardly away from each other and inwardly against each other.

Such a tool configuration comprising a carving and/or scraping tool configuration can be used to improve production tolerances. The tooling configuration can according to exemplary embodiments of the second aspect comprise several carving and/or scraping tool configurations such that both the first and the second pair of horizontal surfaces can be formed by such tools. The tool configuration can be made very compact and a high quality locking system can be formed since the tools can be balanced and located close to each other along the feeding direction According to a third aspect of the invention a method for producing mechanical locking systems in a floor panel comprising a mechanical locking systems on a first and second edge for horizontal and vertical locking of the floor panel with similar other panels. The floor panel is displaced in a feeding direction relative a carving tool configuration. The method comprises forming on the first or the second edge by the carving tool configuration a tongue or a groove.

According to a fourth aspect of the invention a tool configuration for producing mechanical locking systems in a floor panel comprising a mechanical locking systems on a first and second edge for horizontal and vertical locking of the floor panel with similar other panels. The floor panel is displaced in a feeding direction relative the carving tool configuration. The carving tool configuration for forming on the first or the second edge a tongue or a groove.

This third and fourth principle offers the advantage that a groove or a tongue is formed mainly and preferably completely with non-rotating tools and this can be used to reduce tolerances and production costs. It is even possible to form the majority or the whole locking system with carving. Such forming requires less energy than rotating tools and the tooling cost can be reduced since fewer teeth are needed to form a joint geometry.

A general advantage of the invention is that it enables reduced tolerances, e.g. in the horizontal locking of floor panels in the production of mechanical locking systems, due to a balanced way of manufacturing floor panels and less horizontal turning in the production line.

Another advantage of one exemplary embodiment of the invention is to keep the production cost down with improved tool running time as the down time is decreased in the production line due to shorter time in changing the tools and simpler way by having only to change a part of the tool if it wears out.

Still another advantage of some exemplary embodiments of the invention is reduced cost of the control equipment of the tool configuration, i.e. controlling is less complicated.

Still further advantage of some exemplary embodiments of the invention is decreased production of dust as waist in the production line of floor panels, i.e. the need for sucking out dust is decreased.

Other objects, advantages and novel features of the invention will become apparent from the following detailed description of the invention when considered in conjunction with the accompanying drawings and claims.

BRIEF DESCRIPTION OF THE DRAWINGS

FIGS. 1A-1B is a cross-section of a floor panel illustrating a mechanical locking system and close up of a surface layer, known in the prior art.

FIGS. 4A-4C is a cross section of a side view from the short side of the floor panel with a traditional profiling equipment, as well as a top view of the whole and side view from the short side, of the floor panel after perfect machining, known in the prior art..

FIGS. 5A-5E are manufacturing steps producing a mechanical locking system in a floor panel, known in the prior art.

FIGS. 10A-10C show an exemplary embodiment showing a close-up view of the tip of a carving tool configuration, according to the invention.

DETAILED DESCRIPTION OF EMBODIMENTS

According to an exemplary embodiment of the invention fixed chip-removing surfaces located along the feeding direction, such the ones used in carving and scraping tool configuration can be used in a way to decrease the tolerances. By using fixed chip-removing surfaces when forming on either the first 1 or the second 1' edge at least a part of the first or second pair of locking surfaces 19, 11; 18, 12; that locks the adjacent edges 1, 1' horizontally, and prevents a displacement of the joint edges outwardly away from each other, and inwardly against each other, horizontal turning of the panel during production is reduced, and the tolerance decreased because of that. Further is the tolerances decreased due to that the forming the locking surfaces 18, 12; 19, 11 are done essentially in one step. Due to the construction of the tool it is possible to positioning the tool configurations close to each other along the feeding direction and the profiling can be done in one step.

Figure 9A:
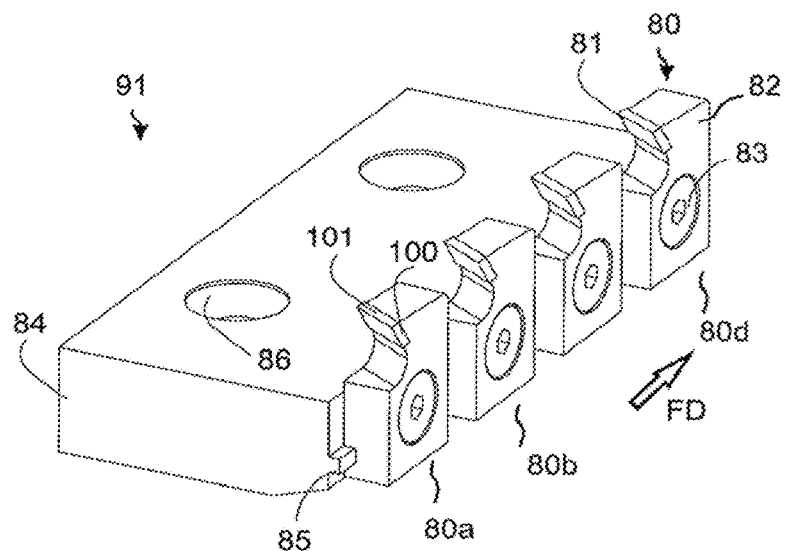
FIGS. 9A-9C show an exemplary embodiment of a carving tool configuration, according to the invention.
Figure 9B:
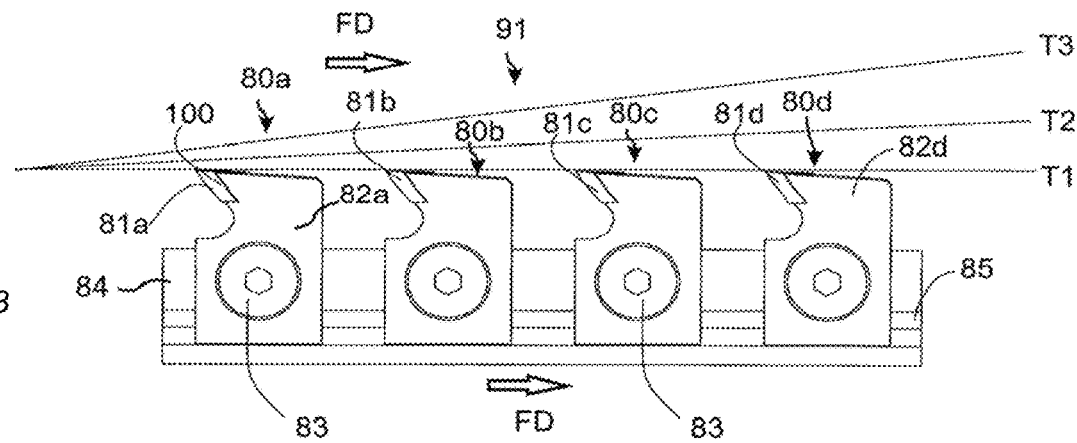
Figure 9C:
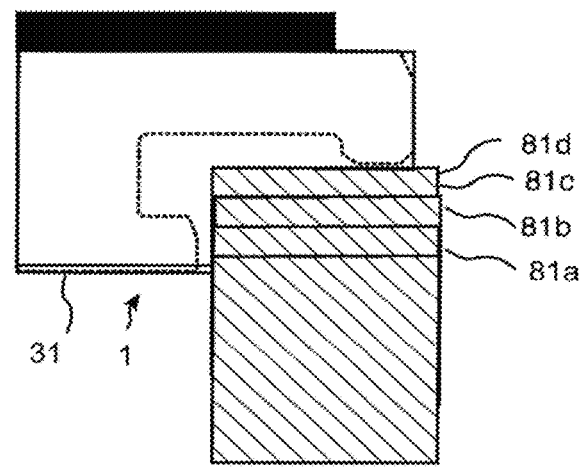

FIGS. 9A-9C show an exemplary embodiment of a carving tool configuration 91 in different perspective views, according to the invention. The carving tool configuration 91 comprises a plurality of chip-removing portions 81*a*-*d* which is located along the feeding direction FD in certain positions in relation to each of the plurality of the other chip-removing portions and the edge of a floor panel where a locking system will be formed. The carving tool configuration 91 has fixed teeth, each tooth 80*a*-*d* comprises of the chip-removing portion 81*a*-*d*, e.g. a cutting surface which is hereinafter called a tip 81 and is set on a holder 82*a*-*d*. A typical tooth 80 is fixed to a fixture 84 with e.g. a screw 83. Preferably a number of teeth, i.e., tip holders 80 can be fixed to the same fixture 84, e.g. 2-8 or more. An exemplary way of fixating the teeth 80 is by positioning each tooth on a bar 85 on the fixture 84. Each fixture 84 has screw holes 86 to be used to fixate the whole fixture 84 in the profiling line. Each tip 81*a*-*d* on the tip holder 82*a*-*d* is arranged on the fixture 84 in a way that each successive tip 81 has a different position horizontally or vertically or both horizontally and vertically. When using the carving tool configuration the dust and chips is for example easily taken care of by simple dust extraction nozzles at each tip. See further down below about different shapes of the teeth for different profiles to be milled.

FIGS. 9A-B show the different tip holders 80*a*-*d* having the same size on the fixture 84. The tips 81*a*-*d* then follow tip line T1. Another exemplary embodiment according to the invention is to have the teeth offset vertically and/or horizontally. The first tooth 80*a* can for example have a size, which is "shorter" than the second "taller" tooth 80*b* etc. In this way the first tooth 80*a* would come into the surface of the material to be removed being "short" enough to hit into the material to be removed, and the second tooth 80*b* have now to remove a next layer of material which is further away from the tip 81*b*, and need thereby to be "taller". In this way the tips on the fixture 84 studying them from the side would have an increasing slope starting from the "shortest" first tooth 80*a* and ending with the "tallest" in last position 80*d* following the tip line T2 or T3 for example.

An exemplary embodiment of how the carving tool configuration 91 has increased running time, according to the invention, is the separate teeth that make it possible to change the wear down tools quickly. The cost of the equipment is also reduced as separate teeth can be changed instead of the whole fixture with teeth. An example scenario is that the first tooth 80*a* hit the material to be removed first and is thereby also the first to be worn down compared to the other teeth in the fixture. It is the first tooth 80*a* to have to be changed for a tooth with a fresh tip 81. If that is the case, the second tooth 80*b* can be moved forward as well as the rest of the teeth, and in the last position that now is empty, a new tooth 80*d* can be placed. This means in the case where the teeth are sloping in the fixture, the last new tooth 80*d* have to be even "taller" than the old one before in that position, resulting in that the first tooth 80*a* also is "taller". The fixture 84 would have to be moved further away from the floor panel to be milled, if the same function or result wants to be encountered. Another exemplary embodiment according to the invention, is to have the different teeth 80 on a fixture 84 positioned on different levels vertically. Here in FIG. 9B a straight bar 85, in the same level vertically, is shown to help the holders 80 to be fixated. If the bar instead would be sloping vertically and the holders would have a corresponding female slope, a tooth 80*d* in last position would be placed higher up than compared to the tooth positioned first, even if the teeth are having the same size and thereby receiving a tooth offset vertically. As a person skilled in the art appreciates different solutions to how the teeth can be fixated are possible e.g., with or without a bar, with a screw or hook and loop tape, also other solutions in having the same size of the teeth are possible, e.g. a bar positioned in steps on different heights vertically etc.

FIG. 9C shows how a groove is formed in an edge 1 with a carving tool 91 showing only the vertically offset tips 81a-81d of the teeth.

Benefits of not using rotating tools are many. For example there is no need for any tool motors and this is a major advantage since the machinery investment and energy consumption is lower and there is no need for an electrical control system. The costs for tool maintenance can be reduced considerably.

With no rotating tools there is less need for advanced dust extraction since the removed material is not thrown away by the high speed of the rotating teeth. A rotating tool gives a very turbulent mixture of removed chips and dust that need to be taken care of. Even in a very sophisticated dust extraction system for rotating tools there is always fractions of dust and chips that goes in to the transport system and causes wear of the tools and affects the precision of the transport system in a negative way, resulting in increased tolerances.

As a person skilled in the art appreciates a rotating tool configuration can be used in combination with a carving or scraping tool configuration by molding the substantial part of the edge and then fine molding the horizontal locking surfaces 18, 12; 19, 11 with the carving or scraping tool configuration. With the special design of the tip 81, see TAB. 2 down below, according to an exemplary embodiment of the invention, the carving tool configuration becomes so effective, so the carving tool configuration can be used in removing the substantial parts as well as for the fine molding. It is the shape of the tip essentially, but also the improved maintenance helps in being able to use the carving tool configuration both for removing the substantial parts as well as the fine molding. It is the separable teeth, according to an exemplary embodiment of the invention, that makes it simple to change the wear down tools fast, and only one tooth instead of a whole fixture with teeth can be changed. If the substantial parts of the edge of the panel 1', 1 are to be removed using only the carving tool configuration there may be a need to change the tip for a fresh one more often. Another solution that can improve how long the fresh tip stay fresh, keeping the down time in the production line short, according to an exemplary embodiment of the invention, is to use a preprocessing step on at least parts of the upper edge, se down below for that solution.

By arranging a number of tip holders 82a-d with a variety of tips 81a-d, all kind of profiles can be achieved, from very simple to very complex profiles.

FIG. 10A illustrates an exemplary embodiment of a side view of a holder 82 with a tip 81 according to the invention. FIG. 10B illustrates a top view of the same holder with the tip. FIG. 10C illustrates a close-up view of the same tip from the side. The exemplary embodiment of the tip 81 according to the invention is sharp. A sharp tip is equal to a small clearance angle A and results in that the rake angle C can be increased, which is not possible for a rotating tool configuration, see FIG. 7B. The sharp tip is also fixed to a holder resulting in a permanent tool. The surface of the edge of the floor panel is moving towards the chip-removing surface 81 instead of intermittently "hitting" the surface to be removed, as in the rotating tool configuration. The material is carved away with the sharp tip, leaving very little cutter marks, see the cutter marks H1-H3 made by the rotating tool in FIG. 7C.

Figure 2A:
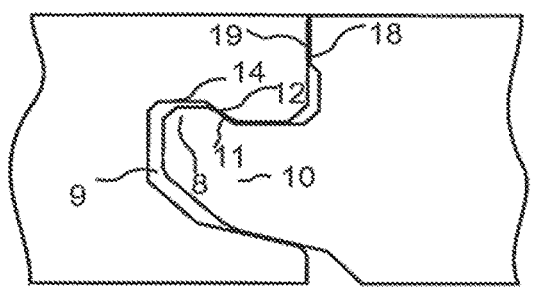
FIGS. 2A-2C illustrate different types of mechanical locking systems, known in the prior art.
Figure 2B:
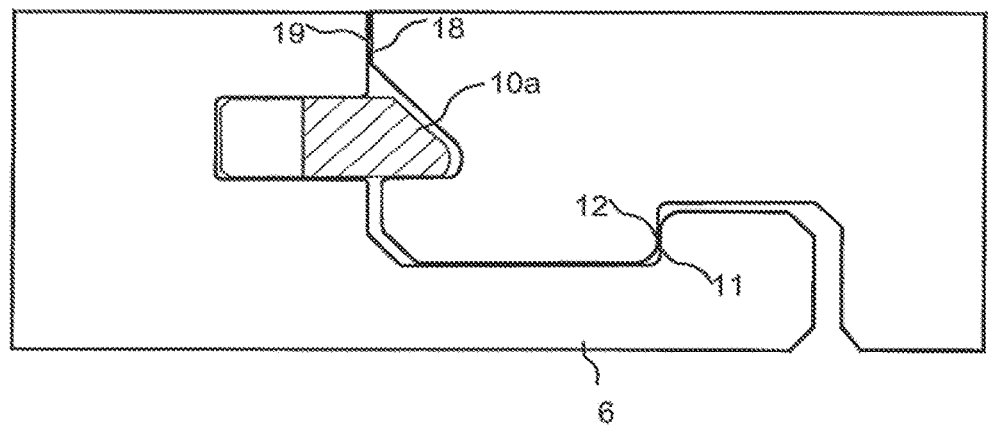
Figure 2C:
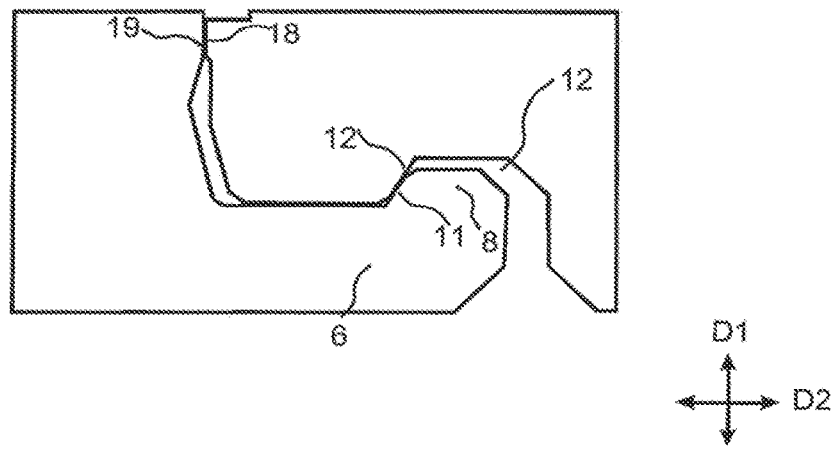
Figure 3A:
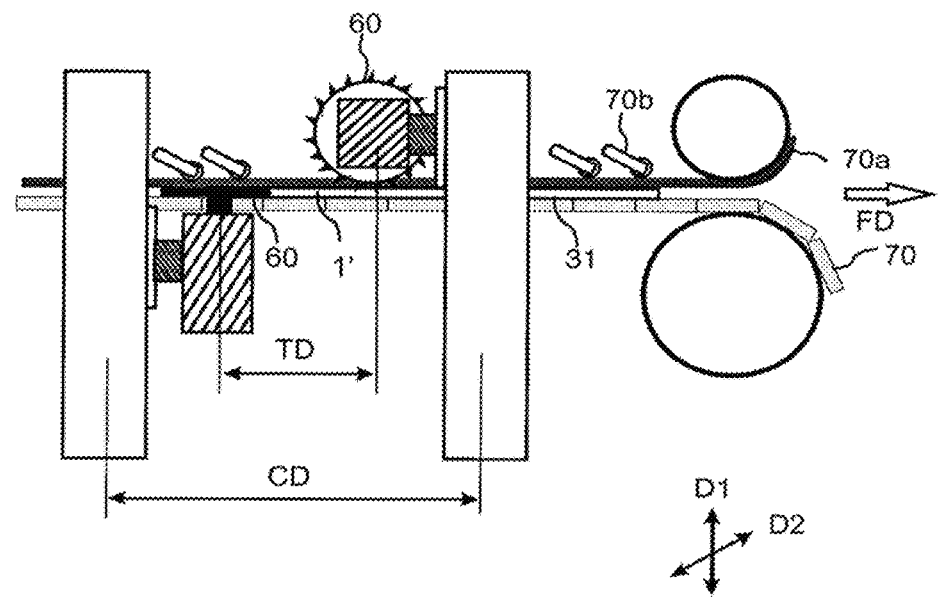
FIGS. 3A-3B is a side and top view of a traditional profiling line for producing floor panels with a wear resistant top surface layer, known in the prior art.
Figure 3B:
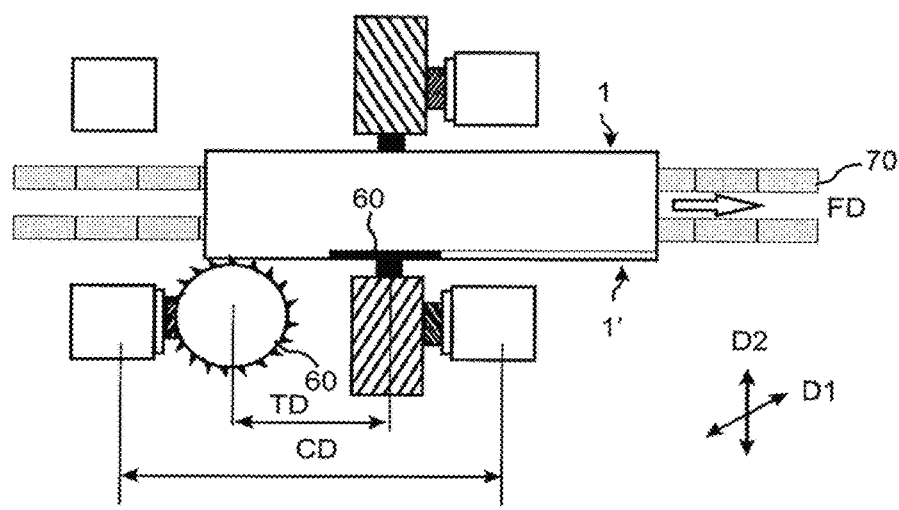
Figure 6A:
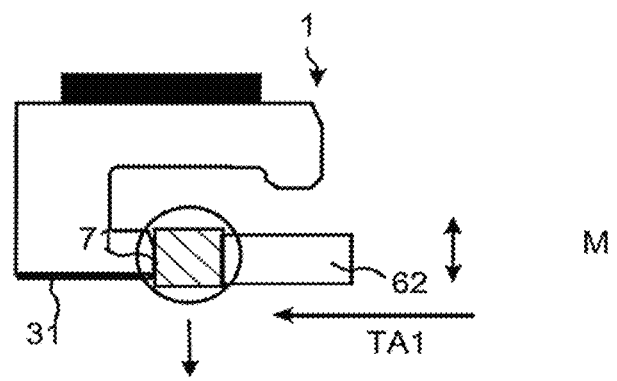
FIGS. 6A-6C illustrate cross sections of a rotating tools known in the prior art which are used to form mechanical locking systems.
Figure 6B:
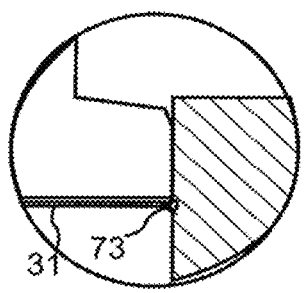
Figure 6C:
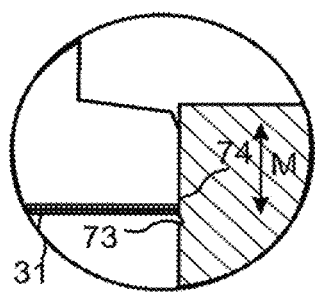
Figure 7A:
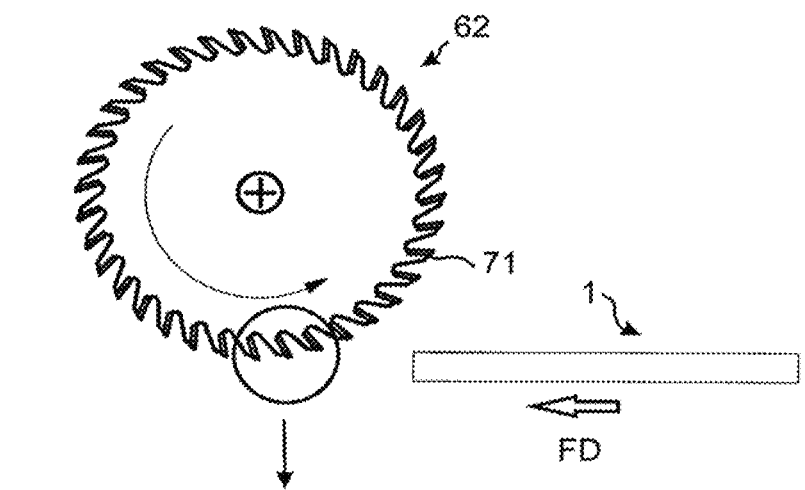
FIGS. 7A-7C illustrate cross sections of a rotating tools known in the prior art which are used to form mechanical locking systems and machined material.
Figure 7B:
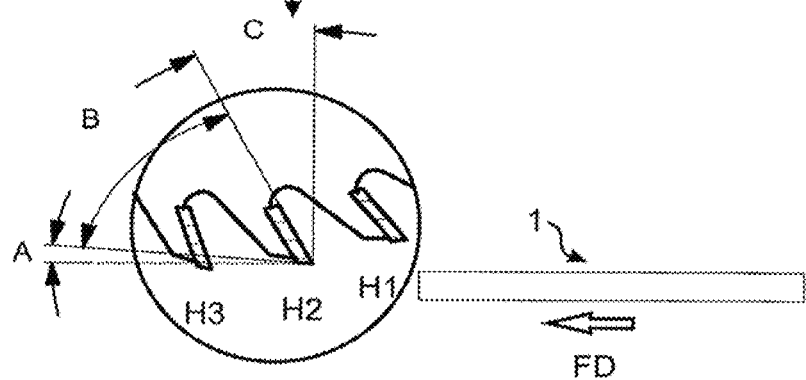
Figure 7C:
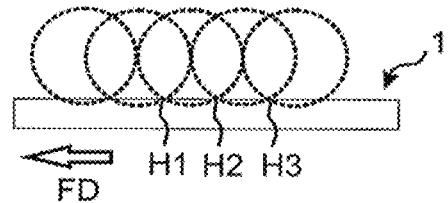
Figure 8:
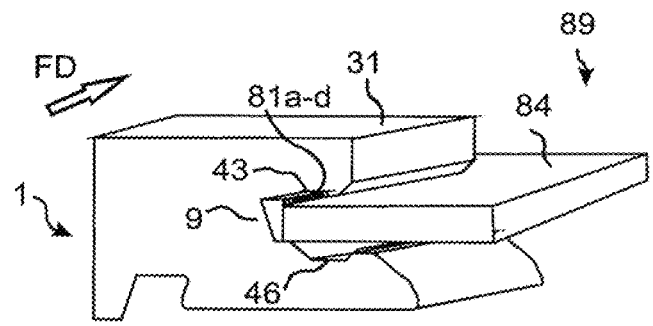
FIG. 8 illustrates a scraping tool configuration, known in the prior art.

TAB. 2 shows two columns of tool tip angles, according to prior art, of scraping tools, as for example the one in FIG. 8, and rotating tool configurations 62, as for example the one in FIG. 5B and FIG. 7A, and a column of an exemplary embodiment of tool tip angles of the carving tool configuration, according to the invention. The exemplary embodiment have a clearance angle A essentially between 2-8 degrees which is very small, and a rake angle C essentially between 20-30 degrees. That gives further a cutting angle B, essentially between 55-65 degrees. The TABLE 2 show further that the scraping and rotating tool configurations according to prior art have their angles A, B and C in a total other range.

TABLE 2

| ANGLE | Scraping | Method Rotation | Carving |
|---|---|---|---|
| A-Clearance angle | 9-10° | 10-12° | 2-8° |
| B-Cutting angle | 70-75° | 70-75° | 55-65° |
| C-Rake angle | 5-10° | 5-7° | 20-30° |
| KIND OF OPERATION | permanent | intermittent | permanent |

A lower clearance angle A gives the possibilities to form a stronger tip with maintained cutting angle B or even a decreased cutting angle B. A lower cutting angle B result in the material is carved away not scraped or broached. The sharp tip 81 result in that the removed chips have a different shape, the chips and dust have a shape and construction that is more easy to handle than the chips and dust produced during scraping or broaching. The form of the chips is easier to handle and the dust extraction is improved, the production is not interfered and does not increase the tolerances. The sharp tip have an optimal cutting angle B and is working better with the fibers of the material to be machined, which result in that the tip itself is not as easy worn down, increasing the running time, as little force as possible is used in removing the material.

The exemplary embodiment according to the invention, of the carving tool configuration 91 with its separate teeth 80 on a fixture 84 can also be applied on a broaching and scraping tool, as well as the method for the maintenance when changing one tooth at the time. The shape of the tip would then coincide with the data in TAB. 2 of the scraping tool.

Figure 11:
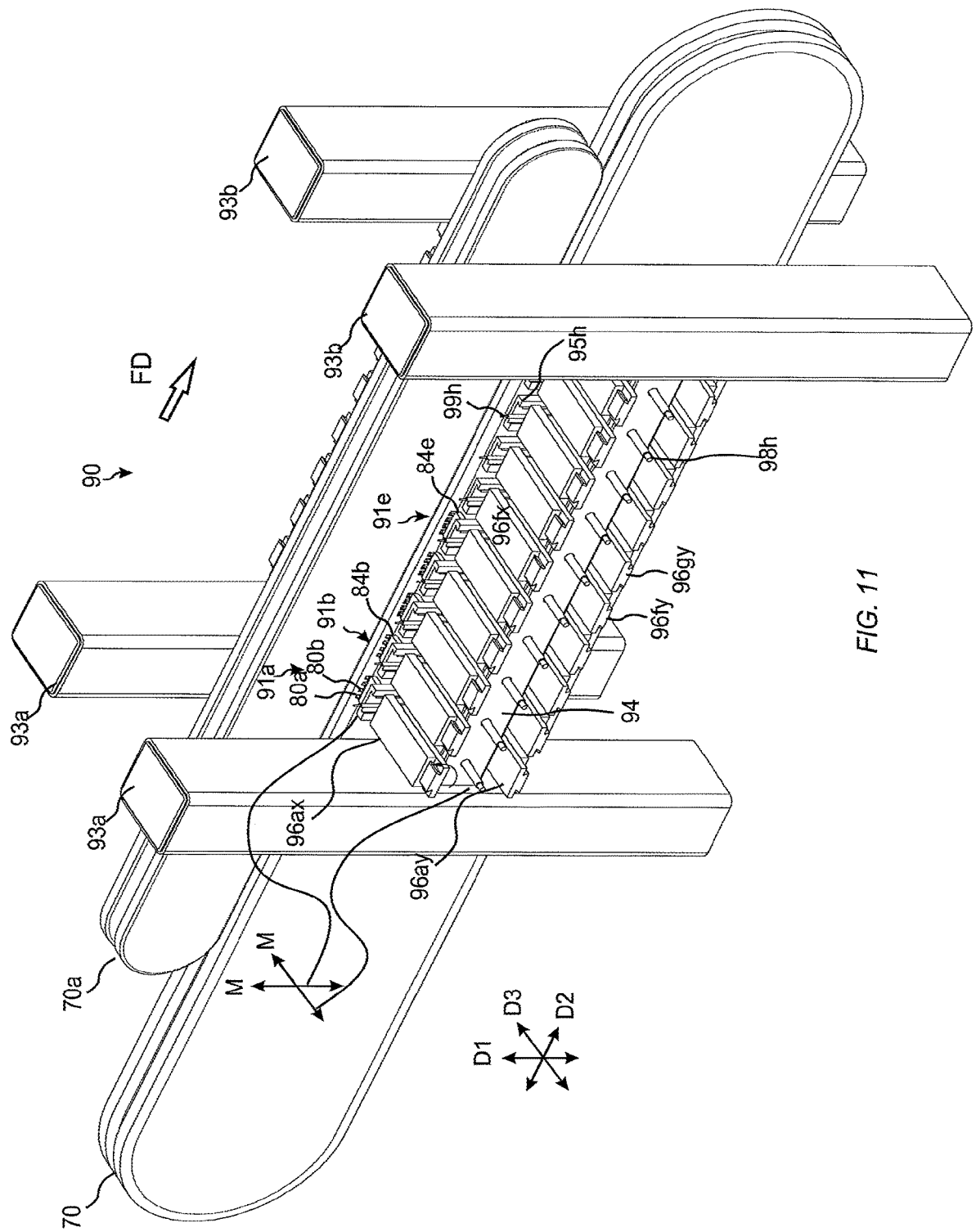
FIG. 11 is an exemplary embodiment of a processing line incorporating carving tool configurations, according to the invention.

FIG. 11 shows an exemplary embodiment of a processing line 90 incorporating carving tool configurations 91a-j according to the invention. Material to be processed by a carving tool configuration 91 is transported in a controlled way towards the tips of the teeth 80a-d in the feeding direction FD. This transport consists of a lower carrying part 70 and an upper fixation part 70a. As a person skilled in the art appreciates different solutions to how the material to be machined is fed forward are possible e.g. using a chain and a belt, two belts, wheel and a belt, two wheels. The fixtures 84a-j are each fixed to an adjustable support 95a-j, horizontally or vertically, or both horizontally and vertically and swiveling. A number of mentions support can be arrange after each other.

When the material to be processed is transported against and hit the first tip of the first tooth 80a a small amount of material is removed, how much and what shape is determined by the position and shape of the first tip. Next tip of the second tooth 80b removes slightly more material, how much is determined by the different position of this tip in relation to the previous tip.

Between two columns the first 93a and second 93b profiling on the groove side, or first 93a and second 93b profiling on the tongue side, a number of carving tool configurations 91a-j are positioned. Each fixture 84a-j are fixed to a beam 94 positioned horizontally D2 between the first 93a, and second 93b column by vertically D1 positioned tables 95a-j with holders. Each vertical D1 table 95a-j is fixed by two horizontal D3 tables, one table 96ax-jx, on top of the beam 94 and one table 96ay-jy under the beam 94. By the vertical D1 tables 95a-j the fixtures 84a-j with its teeth 80a-d, the carving tool configuration 91a-j, can be moved up and down screwing on the stick 99a-j. By the two horizontal D3 tables 96ax-jx,96ay-jy the fixture 84a-j is moved in and out, or closer and away from the floor panel to be profiled by screwing on the stick 98a-j. The down table 96ay-jy is more to give an even support to the vertical D1 table 95a-j and can be deleted. As a person skilled in the art appreciates different solutions to how the fixtures 84a-j are attached and controlled in a profiling line are possible.

The floor panel is moved horizontally D2 in a linear feeding direction FD by a chain 70. A belt 70a is used to create a vertical D1 pressure against the chain. The belt has no stability in the horizontal D3 direction perpendicularly to the feeding direction FD D2. The vertical D1 and horizontal position D2 of the floor panel is obtained by the chain 70, which moves with high precision in relation to the carving tools. The surface layer of the floor panel is fixed to the chain with friction.

Manufacturing of a floor panel using a carving tool configuration can be performed on two opposite side simultaneously, on the groove side 1 and the tongue side 1', or only on one side. For optimized achievements of the invention, two opposite tool stations positioned in relation to the feeding direction FD of the machine give the best result.

Carving or broaching or scraping tool, according to an exemplary embodiment of the invention, can be used to eliminate production tolerances and especially such tolerances that are related to horizontal turning. A locking surface on a locking element and an upper edge can be formed with carving or scraping tools that are positioned very close to each other. A locking surface on a locking groove and an upper edge can be formed in a similar way. By carving or scraping those surfaces in one step substantially all tolerances related to horizontal turning can be eliminated.

Figure 12:
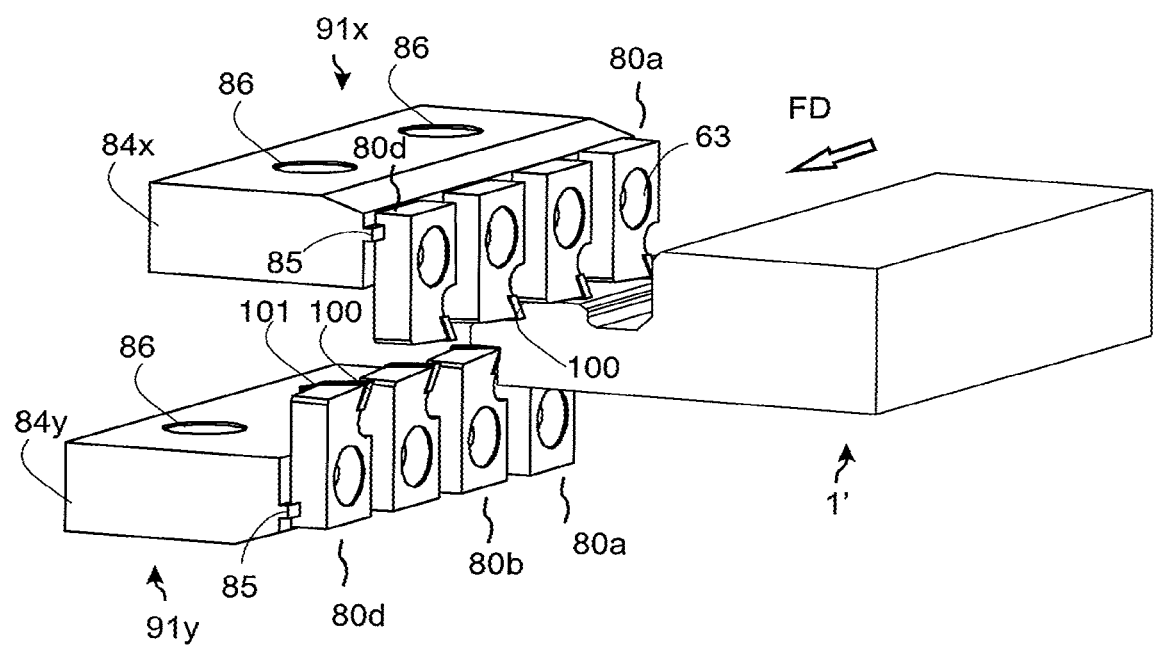
FIG. 12 is an exemplary embodiment of a double carving tool configuration, according to the invention.

FIG. 12 illustrates an exemplary embodiment of how the production tolerances can be eliminated, according to the invention. Here the carving tool configuration 91 is illustrated as an example. A carving tool configuration can have beside the two opposite tool stations in the feeding direction, an upper carving tool 91x as well as a bottom carving tool 91y that further can eliminate the tolerances as they work positioned close to each other, machining the horizontal locking surfaces 11, 19; 12, 18 in the same step, the tolerance is decreased. The down tables 96ay-jy, see FIG. 11, are here to give an even support. A bottom carving tool 91y here needs to be supported by the down tables 96ay-jy. Dependent on what locking system to produce the shape of the tips vary, and how the teeth 80 are positioned on the fixtures 84 are dependent on if to profile the material from above or from below. The top tables 96ax-jx are chosen to fixate the fixture and machining from above and the bottom tables 96ay-jy are chosen to fixate the fixture machining from below. If FIG. 11 also would illustrate the production line 90 using double fixtures 84x, 84y as in FIG. 12, the tips on the teeth 80a-d would be pointing downwards, and not as can be seen in FIG. 11 pointing upwards. The bottom fixtures 84y would then have teeth with tips be pointing upwards, as shown in FIG. 12 and which is not shown in FIG. 11. Machining the material from top and bottom simultaneously.

The exemplary embodiment according to the invention, of the carving tool configuration 91 with its separate teeth 80 on a fixture 84 machining the material from top and bottom simultaneously eliminating the production tolerances can also be applied on a broaching and scraping tool, as well as the method of how the production tolerances can be eliminated. The shape of the tip would then coincide with the data in TAB. 2 of the scraping tool.

Figure 13:
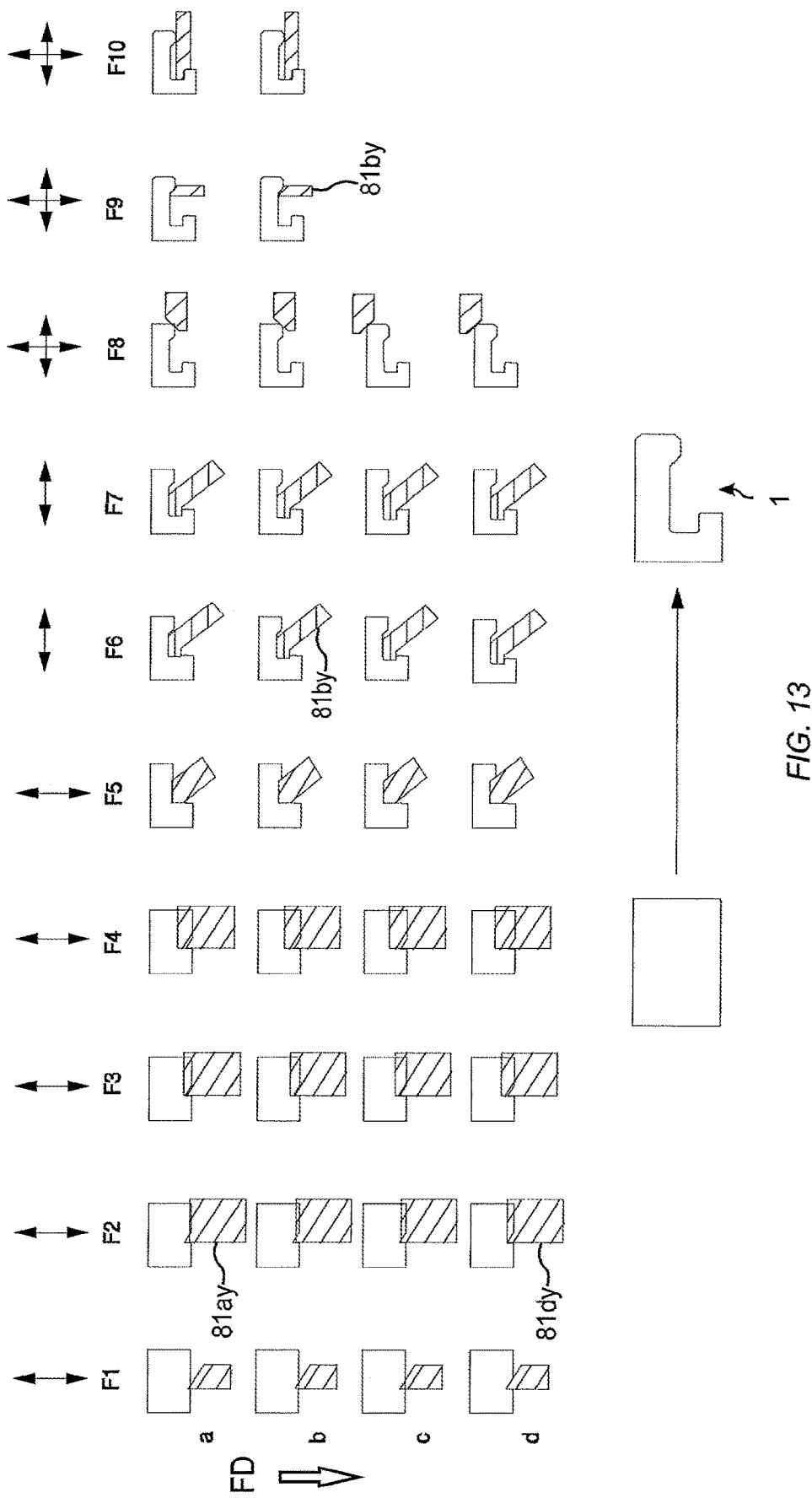
FIG. 13 is an exemplary embodiment of a processing line of groove side, according to the invention.
Figure 14:
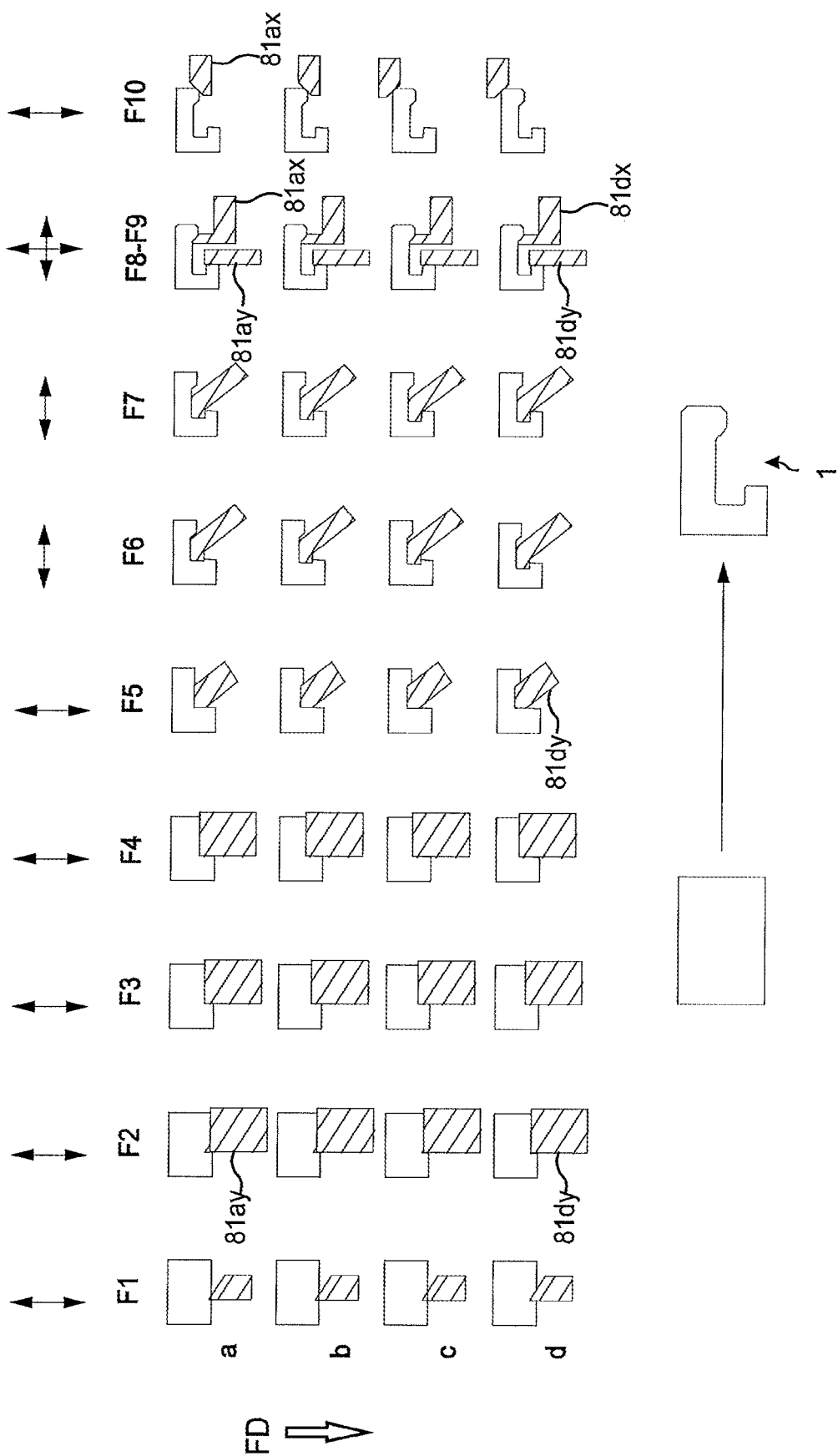
FIG. 14 is an exemplary embodiment of a processing line of groove side incorporating a double carving tool configuration, according to the invention.
Figure 15:
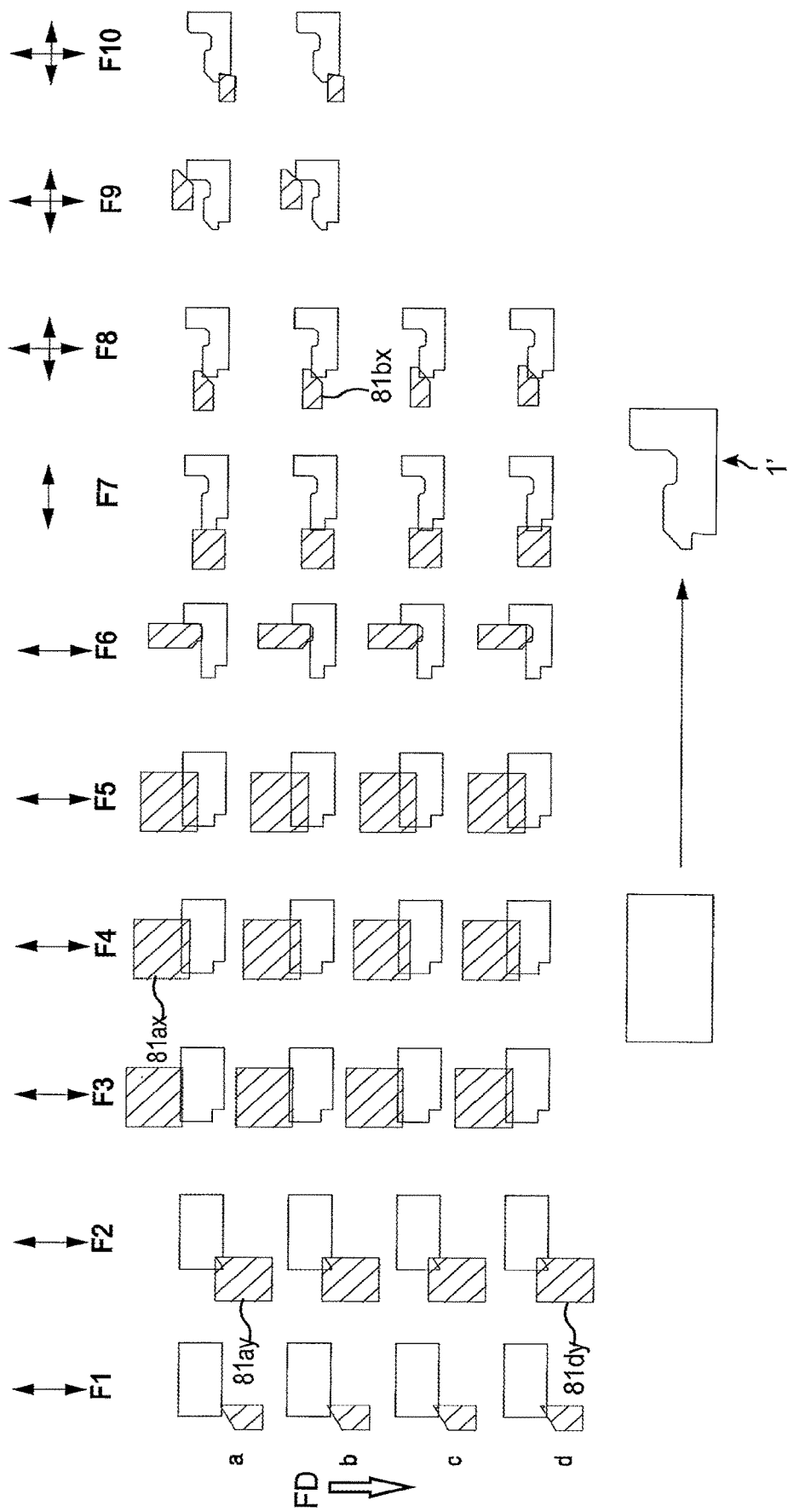
FIG. 15 is an exemplary embodiment of a processing line of tongue side, according to the invention.
Figure 16:
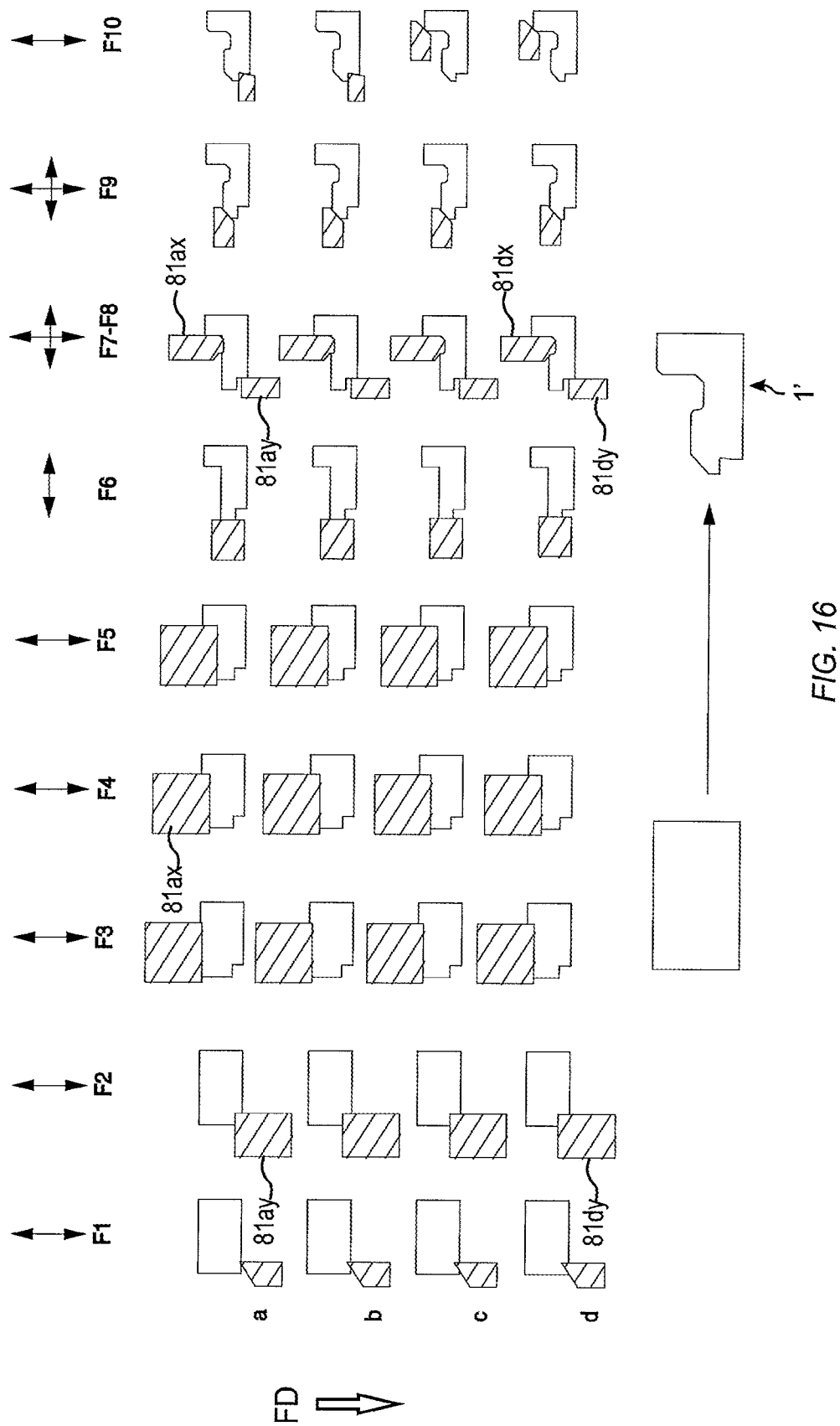
FIG. 16 is an exemplary embodiment of a processing line of tongue side incorporating a double carving tool configuration, according to the invention.

FIGS. 13-16 illustrate exemplary embodiments of a profiling line 90 incorporating carving tool configurations 91a-j according to the invention. FIGS. 13-14 are the profiling line of the groove side 1 and FIG. 15-16 the profiling line of the tongue side 1'. They illustrate in a schematic way how the different tips 81a-d can be positioned on each holder, and how each tip profiles a little part of the floor panel 1, 1' as it moves against the first carving tool configuration illustrated with first fixture F1 and second with fixture F2 etc. The arrows illustrate how the fixtures F1-F10 can be moved in different directions. FIG. 14 illustrates in fixture 8-9 F8-F9 and in fixture 7-7 F7-F8 in FIG. 16 a double carving configuration tool 91x-y incorporated.

Another exemplary embodiment of a method and a carving tool configuration incorporated into the method according to the invention, is a method where an improved mechanical locking system in a floor panel is produced. The mechanical locking system in the floor panel comprising a first 1 and second 1' edge for horizontal and vertical locking of the floor panel with similar other panels. The floor panel is displaced in a feeding direction FD with its first 1 or second 1' edge, each relative the carving tool configuration 91. The carving tool configuration 91 forms on the first 1 or the second 1' edge a tongue 10 or a groove 9.

The general problem with high abrasive material is that the wear resistant surface layer wears down the tools too fast to allow a cost efficient production. The present invention has solved this problem by reducing or completely eliminating the wear resistance of the joint edge portion before machining using the carving tool configuration.

According to an exemplary embodiment of the invention a preprocessing step or a preprocessing tool configuration can be incorporated, this will give a longer life time of the carving tools creating the locking surfaces, the preprocessing step or preprocessing tool will be described now. An exemplary manufacturing method embodiment, with improved profiling accuracy for mechanical locking of floor panels is obtained using the carving tool configuration step in combination with a preprocessing step, according to the invention.

Figure 17A:
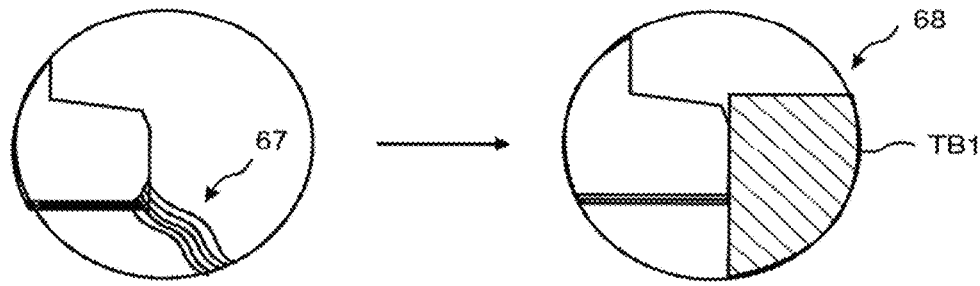
FIGS. 17A-17D are exemplary embodiments of a preprocessing step, according to an embodiment of the invention.
Figure 17B:
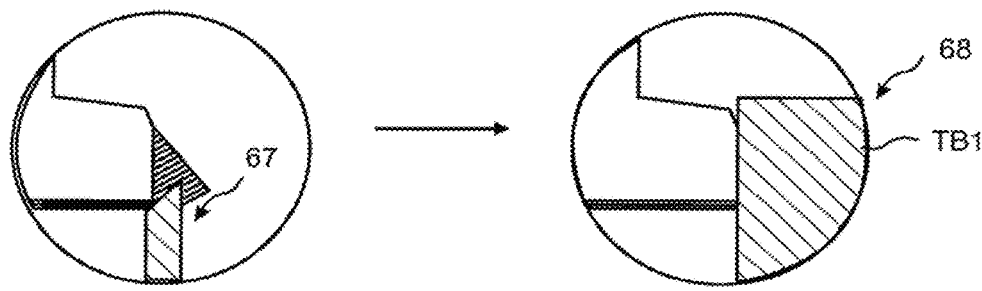
Figure 17C:
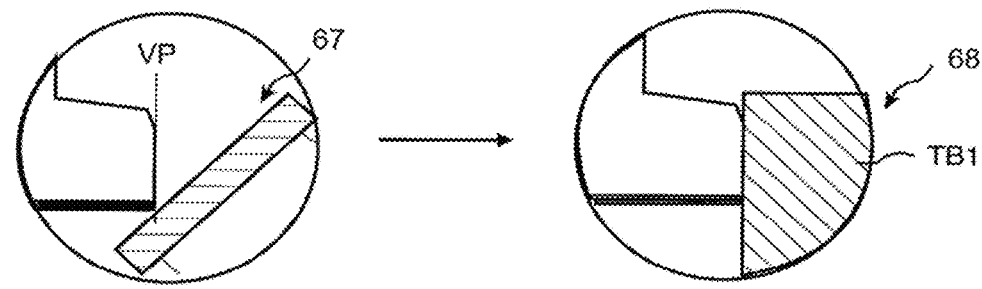
Figure 17D:
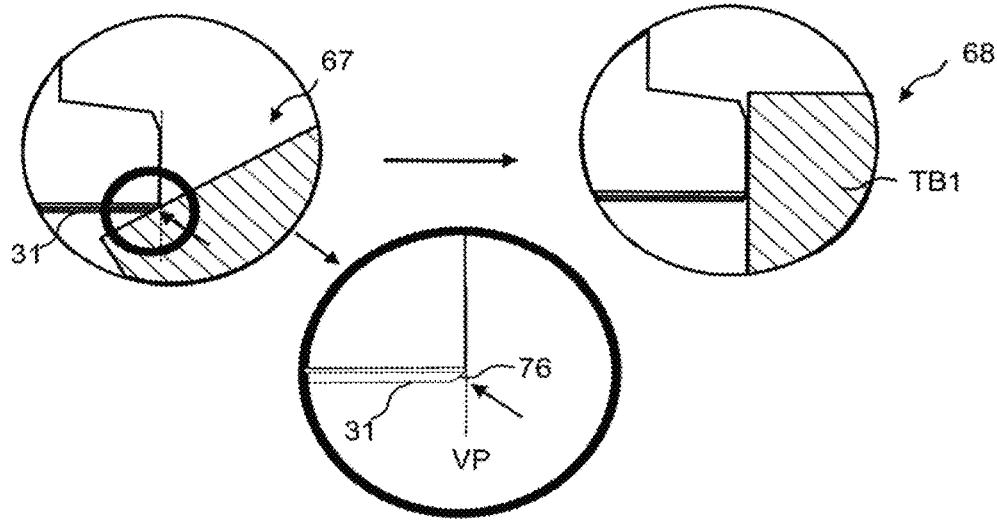

FIGS. 17A-17D show exemplary embodiments of the preprocessing step, according to the invention. Heat as one embodiment, FIG. 17A, will for instance soften the wear resistant top surface layer. When the high abrasive particles, e.g. aluminum oxide, are not well fixed in a matrix, heating up the wear resistant top surface layer will reduce the wear resistance of the top surface layer. Heat can for example be introduced with IR (Infrared Radiation), just before the final profiling of the joint surfaces which is gathered at one tool station, in the profiling machine or even before the profiling line starts in the machine. Laser as another embodiment can also be used as means for heating since it is both efficient and can access the surface layer extremely close to the fine cutter. Heating can for example be done beside with laser, infrared lamps or hot air, with other methods, as a person skilled in the arts appreciates, as hot sliding shoe, microwaves and other known heating technologies or a combination of the same. The use of laser only for the purpose of heating instead of cutting will also ensure a very accurate wear reduction whereby the life time of the fine cutter will be longer. Another exemplary embodiment of an alternative preprocessing step according to the invention, is to add a lubricant e.g. wax on at least parts of the top surface layer of the floor panel. Heating or lubricating will be done on a part of a ridge of the wear resistant top surface layer. FIG. 17B shows a further exemplary embodiment of an alternative preprocessing step, according to the invention. A part of the decorative wear resistant top surface layer 31 is removed with a scraping tool comprising several teeth positioned along the feeding direction. FIG. 17C shows a preprocessing with an intermediate preprocessing tool 67 which is positioned precisely at the vertical plane VP. FIG. 17D show a preprocessing tool 67 which is positioned such that it removes a part of the wear resistant layer inside the vertical plane VP and forms a ridge 76 on the surface layer 31.

The invention claimed is:

1. A method for producing a mechanical locking system in a floor panel comprising a core having a core surface, the mechanical locking system comprising components on a first edge and a second edge of the floor panel for horizontal locking of the floor panel with other similar floor panels at a vertical plane, the components comprising a tongue on one of the first edge or the second edge, a tongue groove on the other of the first edge or the second edge, and a locking element locking surface on a locking element of a locking strip on the first or second edge, the tongue and tongue groove being configured to vertically lock the floor panel with the other similar floor panels, wherein the tongue groove has an opening facing toward a horizontal end of the other of the first edge or the second edge, the locking element locking surface configured to horizontally lock the first or second edge of the floor panel with a first adjacent edge or a second adjacent edge of similar floor panels to prevent a relative displacement of the first or second adjacent edge and the first or second edge outwardly away from each other, the method comprising:
displacing the floor panel in a feeding direction relative to non-rotating chip-removing surfaces located along the feeding direction to remove the core of the floor panel from at least the core surface and extending continuously to the locking strip, to form via the non-rotating chip-removing surfaces at least a part of the locking element locking surface, and to form a majority of the tongue groove using the non-rotating chip-removing surfaces.

2. The method according to claim 1, wherein the tongue is on the first edge, the tongue groove is on the second edge, and the locking surface on the locking element of the locking strip is on the second edge, and displacing the floor panel forms in the second edge of the floor panel at least the part of the locking surface on the locking element.

3. The method according to claim 1,
wherein the displacing is performed such that the at least a part of the locking element locking surface and the majority of the tongue groove are formed, via the non-rotating chip-removing surfaces, from an edge portion of the panel having constant thickness substantially similar to a thickness of a remainder of the panel.

4. The method according to claim 2, the components further comprising a top part locking surface on a top part of the second edge at the vertical plane, the locking element locking surface on the locking element and the top part locking surface on the top part of the second edge at the vertical plane making a first pair of locking surfaces, the first pair of locking surfaces configured to horizontally lock the second edge of the floor panel with the second adjacent edge to prevent a displacement of the second adjacent edge and the second edge outwardly away from each other and inwardly against each other, the method further comprising:
displacing the floor panel in the feeding direction relative to the non-rotating chip-removing surfaces located along the feeding direction to remove the core of the floor panel to form in the second edge of the floor panel at least a part of the locking surface on the top part of the second edge at the vertical plane.

5. The method according to claim 4, wherein, the first edge of the floor panel comprises a second pair of locking surfaces comprising a locking surface on a top part of the first edge at the vertical plane and above the tongue, and a locking surface on a locking groove in the first edge, the second pair of locking surfaces configured to horizontally lock the first edge of the floor panel with the first adjacent edge to prevent a displacement of the first adjacent edge and the first edge outwardly away from each other and inwardly against each other, the method further comprising:
displacing the floor panel in the feeding direction relative to the non-rotating chip-removing surfaces located along the feeding direction to remove the core of the floor panel to form in the second edge of the floor panel at least a part of the first pair of locking surfaces.

6. The method according to claim 5, wherein the chip-removing surfaces carve and/or scrape the first or second edge of the floor panel to form at least a part of one of the first and second pairs of locking surfaces.

7. The method according to claim 2, wherein each of the chip-removing surfaces comprises a tip fixed at a position on a first holder, the tip having a certain angle with respect to the holder.

8. The method according to claim 7, wherein the first holder is fixed in a certain position on a fixture of a carving tool.

9. The method according to claim 8, further comprising a second holder having a tip fixed at a position on the second holder, wherein the first and second holders are fixed to one side of the fixture, and each tip of the first and second holders is positioned in contact with a different piece of the core surface to be removed from the floor panel, and
the method comprises removing piece by piece the material of the second edge of the floor panel by moving the floor panel in the feeding direction against each of the tips.

10. The method according to claim 8, wherein the carving tool includes at least an upper fixture and a lower fixture, and a first holder is fixed to one side of the upper fixture and a second holder is fixed to one side of the lower fixture, the tip of the first holder on the upper fixture and the tip of the second holder on the lower fixture are respectively positioned to be in contact with an upper part and a lower part of the material of the first or second edge of the floor panel to be removed, and the method comprises moving the floor panel in the feeding direction against each of the tips.

11. The method according to claim 8, wherein the carving tool includes a plurality of fixtures, each fixture having at least one holder, and the method comprises forming with each fixture a different portion of the mechanical locking system.

12. The method according to claim 8, wherein a plurality of holders are fixed to the fixture, and the method further comprises changing a holder on the fixture by detaching the holder from the fixture, detaching and moving remaining holders forward, fixing the remaining holders in new positions, and adding a new holder on the fixture.

13. The method according to claim 7, wherein the tip of the holder has a clearance angle between 2 to 8 degrees.

14. The method according to claim 13, wherein the tip of the holder has a rake angle between 20 to 30 degrees.

15. The method according to claim 2, further comprising:
preprocessing at least a part of the core surface layer of the floor panel on the first or second edge such that properties of the surface layer are changed.

16. The method according to claim 15, wherein the preprocessing includes removing at least a part of the surface layer of the floor panel on the first or second edge with a first preprocessing tool.

17. The method according to claim 16, wherein the preprocessing includes removing a part of a ridge on an upper edge of the top surface layer.

18. The method according to claim 15, wherein the preprocessing includes softening through lubricating or softening by heating a part of a ridge of the top surface layer.

19. The method according to claim 18, wherein the part of the ridge is lubricated with wax.

20. The method according to claim 18, wherein the part of the ridge is heated by one of laser, infrared lamps, hot air, hot sliding shoe and microwaves.

21. The method according to claim 4, wherein the part of the first pair of locking surfaces that are formed by the non-rotating chip-removing surfaces is at least the locking surface on the top part of the second edge at the vertical plane and above the tongue groove.

22. The method according to claim 5, wherein the part of the first pair of locking surfaces that are formed by the non-rotating chip-removing surfaces is at least the locking surface on the locking surface on a locking element of a locking strip on the second edge.

23. The method according to claim 7, wherein the tip of the holder has a rake angle between 20 to 30 degrees.

* * * * *